(12) United States Patent
Thompson et al.

(10) Patent No.: US 11,379,730 B2
(45) Date of Patent: Jul. 5, 2022

(54) PROGRESSIVE OBJECTIVE ADDITION IN MULTI-OBJECTIVE HEURISTIC SYSTEMS AND METHODS

(71) Applicant: THE AEROSPACE CORPORATION, El Segundo, CA (US)

(72) Inventors: Timothy Guy Thompson, Purcellville, VA (US); Ronald Scott Clifton, Leesburg, VA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 953 days.

(21) Appl. No.: 15/184,577

(22) Filed: Jun. 16, 2016

(65) Prior Publication Data

US 2017/0364812 A1    Dec. 21, 2017

(51) Int. Cl.
*G06N 3/12* (2006.01)
*G06Q 10/04* (2012.01)

(52) U.S. Cl.
CPC ............. *G06N 3/126* (2013.01); *G06Q 10/04* (2013.01)

(58) Field of Classification Search
None
See application file for complete search history.

(56) References Cited

U.S. PATENT DOCUMENTS

| | | | |
|---|---|---|---|
| 5,222,192 A | 6/1993 | Shaefer | |
| 5,255,345 A | 10/1993 | Shaefer | |
| 5,319,781 A | 6/1994 | Syswerda | |
| 5,568,500 A | 10/1996 | Furuya et al. | |
| 6,532,076 B1 | 3/2003 | Sidorowich | |
| 6,651,046 B1 | 11/2003 | Sato et al. | |

(Continued)

FOREIGN PATENT DOCUMENTS

WO    WO2010132804 A1    11/2010

OTHER PUBLICATIONS

Taillard, Éric D., and Stefan Voss. "POPMUSIC—Partial optimization metaheuristic under special intensification conditions." Essays and surveys in metaheuristics. Springer, Boston, MA, 2002. 613-629. (Year: 2002).*

(Continued)

*Primary Examiner* — Daniel T Pellett
(74) *Attorney, Agent, or Firm* — Lee & Hayes, P.C.

(57) ABSTRACT

Systems and methods are provided for performing multi-objective optimizations with a relatively large number of objectives to which optimization is to be performed. The objectives of the optimization problem may be partitioned to two or more subsets (e.g., overlapping or non-overlapping subsets) of objectives, and partial optimization(s) may be performed using a subset or combination of subsets of the objectives. One or more of the partial optimizations may use one or more pareto-optimized chromosomes from a prior partial optimization. A final full optimization may be performed according to all of the objectives of the optimization problem and may use one or more chromosomes of any preceding partial optimization as a starting point for finding a final solution to the optimization problem. Any variety of processes may be employed to mitigate archive explosion that may be associated with relatively large objective sets.

20 Claims, 17 Drawing Sheets

(56) References Cited

U.S. PATENT DOCUMENTS

| | | |
|---|---|---|
| 6,662,167 B1 | 12/2003 | Xiao |
| 6,941,287 B1 | 9/2005 | Vaidyanathan et al. |
| 7,835,929 B2 | 11/2010 | Bennett |
| 7,996,344 B1 | 8/2011 | Goel |
| 8,069,127 B2 | 11/2011 | Taylor et al. |
| 8,255,344 B2 | 8/2012 | Ferringer et al. |
| 8,255,345 B2 | 8/2012 | Ferringer et al. |
| 8,285,653 B2 | 10/2012 | Ferringer et al. |
| 8,433,662 B2 | 4/2013 | Ferringer et al. |
| 8,494,988 B2 | 7/2013 | Ferringer et al. |
| 8,498,952 B2 | 7/2013 | Ferringer et al. |
| 8,504,496 B2 | 8/2013 | Ferringer et al. |
| 8,560,472 B2 | 10/2013 | Ferringer et al. |
| 8,862,627 B2 | 10/2014 | Ferringer et al. |
| 9,189,733 B2 | 11/2015 | Thompson et al. |
| 9,321,544 B2 | 4/2016 | Thompson et al. |
| 2002/0013776 A1 | 1/2002 | Kishi |
| 2002/0120407 A1 | 8/2002 | Stevens |
| 2005/0187846 A1 | 8/2005 | Subbu et al. |
| 2005/0256684 A1 | 11/2005 | Jin et al. |
| 2007/0005522 A1 | 1/2007 | Wren |
| 2008/0010044 A1 | 1/2008 | Ruetsch |
| 2008/0094250 A1 | 4/2008 | Myr |
| 2008/0215512 A1 | 9/2008 | Narzisi et al. |
| 2008/0234944 A1 | 9/2008 | Schaffer et al. |
| 2008/0241839 A1 | 10/2008 | Potkin et al. |
| 2009/0313191 A1 | 12/2009 | Yao et al. |
| 2010/0040281 A1 | 2/2010 | Chen et al. |
| 2010/0046806 A1 | 2/2010 | Baughman et al. |
| 2010/0292929 A1 | 11/2010 | Ferringer et al. |
| 2010/0293120 A1 | 11/2010 | Ferringer et al. |
| 2010/0293122 A1 | 11/2010 | Ferringer et al. |
| 2010/0293313 A1 | 11/2010 | Ferringer et al. |
| 2011/0078100 A1 | 3/2011 | Goel |
| 2011/0231320 A1 | 9/2011 | Irving |
| 2011/0276527 A1 | 11/2011 | Pitcher et al. |
| 2012/0029965 A1 | 2/2012 | Steffen et al. |
| 2012/0063590 A1 | 3/2012 | Dortschy et al. |
| 2012/0084314 A1 | 4/2012 | Ferringer et al. |
| 2013/0024395 A1 | 1/2013 | Clark et al. |
| 2013/0054045 A1 | 2/2013 | Ramezani et al. |
| 2013/0132042 A1 | 5/2013 | Chan |
| 2013/0218526 A1 | 8/2013 | Lev et al. |
| 2014/0039689 A1 | 2/2014 | Honda et al. |
| 2014/0278695 A1 | 9/2014 | Smith et al. |
| 2015/0161629 A1 | 6/2015 | Verma |
| 2015/0170051 A1 | 6/2015 | Bufe, III et al. |
| 2017/0011292 A1 | 1/2017 | Thompson |
| 2017/0068890 A1 | 3/2017 | Thompson |
| 2017/0169353 A1 | 6/2017 | Thompson et al. |
| 2017/0293839 A1 | 10/2017 | Thompson et al. |
| 2018/0082198 A1 | 3/2018 | Thompson et al. |
| 2018/0082209 A1 | 3/2018 | Thompson |

OTHER PUBLICATIONS

Kukkonen et al, "Ranking-Dominance and Many-Objective Optimization," Sep. 25, 2007, IEEE Congress on Evolutionary Computation, pp. 3983-3990.

Office Action for U.S. Appl. No. 14/796,299 dated Jan. 23, 2019, Thompson et al., "Systems and Methods for Multi-Objective Evolutionary Algorithms with Category Discovery," 15 pages.

Office Action for U.S. Appl. No. 15/267,528, dated Apr. 16, 2019, Timothy Guy Thompson,"Systems and Methods for Multi-Objective Optimizations with Objective Space Mapping", 25 pages.

Office Action for U.S. Appl. No. 14/847,424, dated Apr. 19, 2019, Timothy Guy Thompson, "Systems and Methods for Multi-Objective Optimizations with Live Updates", 19 pages.

Patel et al., "Fast Mesh-Sorting in Multi-objective Optimization," 2015, Int'l Federation of Automatic Control (IFAC—PapersOnLine) 48(8), pp. 936-941.

Sorensen, "Route stability in vehicle routing decisions: a bi-objective approach using metaheuristics", Central European Journal of Operations Research, 2006, pp. 193-207.

Abraham, Andrew, "Particle Swarm Optimization of Low-Thrust, Geocentric-to-Halo-Orbit Transfers," May 2014, Thesis and Dissertation, Lehigh University, 202 pages.

Anonymous, <http://www.apptimation.com/Technology/Technology.html>, https://web.archive.org/web/20100701034104/http://www.apptimation.com/Technology/Technology.html, captured Jul. 1, 2010, 1 page.

Barker, Allison, "Aerospace Competes in International Global Trajectory Optimization Competition." Orbiter. Vol. 48, No. 3. Mar. 27, 2008, 1 page.

Benedict et al., "Scheduling of Scientific Workflows Using Niched Pareto GA for Grids"; 2006, IEEE pp. 908-912.

Cantu-Paz, et al.; "Efficient parallel genetic algorithms: theory and practice." 2000; Comput. Methods Appl. Mech. Engrg. 186 (2000) pp. 221-238; Elsevier Science S.A.

Chuang, et al.; "An Extensible Genetic Algorithm Framework for Problem Solving in a Common Environment"; 2000 IEEE; Transactions on Power Systems, vol. 15, No. 1; pp. 269-275.

Deb et al., "A Fast and Elitist Multi-Objective Genetic Algorithm: NSGA-11" Sep. 2000, KanGAL Report No. 200001. 20 pages.

Deb et al., "Evaluating the epsilon-Domination Based Multi-Objective Evolutionary Algorithm for a Quick Computation of Pareto-Optimal Solutions." 2005, Evolutionary Computation (13)4: 501-525.

Deb et al.; "Omni-Optimizer: A generic evolutionary algorithm for single and multi-objective optimization"; 2006; Elsevier; European Journal of Operational Research 185 (2008); pp. 1062-1087.

Erickson et al.; Multi-objective Optimal Design of Groundwater Remediation Systems: Application of the Niced Pareto Genetic Algorithm (NPGA); Advances in Water Resources 25 (2002); pp. 51-65.

Ferringer et al.. "Efficient and Accurate Evolutionary Multi-Objective Optimization Paradigms for Satellite Constellation Design." Journal of Spacecraft and Rockets. vol. 44. No. 3, May-Jun. 2007. 682-691.

Ferringer, Matthew P. "General Framework for the Reconfiguration of Satellite Constellations." 2009, Dissertation, The Pennsylvania State University, Available at <http://etda.libraries. psu.edu/Iheses/approved/WorldWideIndex/ETD-3537/index.html>, 40 pages.

Ferringer et al.; "Many-objective Reconfiguration of Operational Satellite Constellations with the Large-Cluster Epsilon Non-dominated Sorting Genetic Algorithm-11." 2009 IEEE Congress on Evolutionary Computation, 10 pages.

Ferringer et al., "Pareto-hypervolumes for the Reconfiguration of Satellite Constellations." AIAA/AAS Aslrodynamics Specialist Conference and Exhibit. Aug. 18-21, 2008, p. 1-31.

Ferringer et al., "Satellite Constellation Design Tradeoffs Using Multiple-Objective Evolutionary Computation." Journal of Spacecraft and Rockets. vol. 43, No. 6, Nov.-Dec. 2006. 1404-1411.

Hadka et al., "Borg: An Auto-Adaptive Many-Objective Evolutionary Computing Framework," 2013. Evolutionary Computation, 21(2): 231-259.

Horn et al.; "A Niched Pareto Genetic Algorithm for Multiobjective Optimization" 1994; IEEE; pp. 82-87.

Search Report and Written Opinion for International Application No. PCT/US2010/034955 dated Aug. 17, 2010.

Kollat et al., "A Computational Scaling Analysis of Multiobjective Evolutionary Algorithms in Long-Term Groundwater Monitoring Applications." Advances in Water Resources. Jan. 25, 2006. 1-24.

Kollat et al., "A Framework for Visually Interactive Decision-making and Design using Evolutionary Multi-objective Optimization (VIDEO)" Environmental Modelling & Software 22. 2007, 1691-1704.

Kollat et al., "A New Epsilon-Dominance Hierarchical Bayesian Optimization Algorithm for Large Multiobjective Monitoring Network Design Problems" Advances in Water Resources 31. 2008, 828-845.

Kollat et al., "Comparing state-of-the-art evolutionary multi-objective algorithms for long-term groundwater monitoring design." Advances in Water Resources 29 (2006): 792-807. <www.elsevier.com/locate/advwatres>.

(56) References Cited

OTHER PUBLICATIONS

Kollat et al., "The Value of Online Adaptive Search: A Performance Comparison of NSGAII, epsilon-NSGAII and epsilonMOEA." Springer-Verlag Berlin Heidelberg 2005. 386-398.

Laumanns et al.; "Combining Convergence and Diversity in Evolutionary Multi-Objective Optimization"; 2002; Massachusetts Institiute of Technology; Evolutionary Computation 10(3); pp. 1-21.

Lorenz, Edward, "Predictability: A Problem Partly Solved," 1996, In Proc. Seminar on Predictability, vol. 1, No. 1, 18 pages.

Mackey et al., "Oscillation and Chaos in Physiological Control Systems," Jul. 15, 2977, Science. 197(4300): 287-289.

Muhlenbein et al.; "Evolution in time and space—the parallel genetic algorithm."; 1991; Morgan Kaufmann; pp. 1-22.

Office Action for U.S. Appl. No. 13/837,782, dated Jan. 15, 2015, Smith et al., "Systems and Methods for Prioritizing Funding of Projects", 21 pages.

Office Action for U.S. Appl. No. 13/837,782, dated Oct. 20, 2016, Smith et al., "Systems and Methods for Prioritizing Funding of Projects", 16 pages.

Office Action for U.S. Appl. No. 13/837,782, dated Mar. 30, 2017, Smith et al., "Systems and Methods for Prioritizing Funding of Projects", 20 pages.

Office Action for U.S. Appl. No. 13/837,782, dated Apr. 7, 2016, Smith et al., "Systems and Methods for Prioritizing Funding of Projects", 14 pages.

Office action for U.S. Appl. No. 14/796,299, dated Jun. 19, 2018, Thompson, "Systems and Methods for MultiObjective Evolutionary Algorithms with Category Discovery", 22 pages.

Office action for U.S. Appl. No. 14/847,424, dated Jun. 28, 2018, Thompson, "Systems and Methods for MultiObjective Optimizations with Live Updates", 24 pages.

Reed et al. "Parallel Evolutionary Multi-Objective Optimization on Large. Heterogeneous Clusters: An Applications Perspective." Journal of Aerospace Computing Information and Communication. vol. 5. Nov. 2008, 460-478.

Srinivas et al., "Multiobjective Optimization Using Nondominated Sorting in Genetic Algorithms," 1994. Evolutionary Computation, 2(3): 221-248.

Stodgell et al., "Satellite Rendezvous Tours Using Multiobjective Evolutionary Optimization."Astrodynamics 2007 Advances in teh Astronautical Sciences, vol. 129, Part III, Proceedings of the AAS/AIAA Astrodynamics Specialist Conference, Aug. 19-23, 2007, Mackinac Island, Michigan, pp. 2069-2094, 28 pages.

Subbu, et al., "Management of Complex Dynamic Systems based on Model-Predictive Mutli-objective Optimization", IEEE International Conference on Computational Intelligence for Measurement Systems and Applications, Jul. 2006, pages.

Tan et al.; "A Multiobjective Evolutionary Algorithm Toolbox for Computer-Aided Multiobjective Optimization"; 2001; IEEE; Transactions on Systems, Man, and Cybernetics—Part B: Cybernetics, vol. 31, No. 4; pp. 537-556.

Tang, Yong, "Advancing Hydrologic Model Evaluation and Identification Using Multiobjective Calibration Sensitivity Analysis and Parallel Computation." ProQuest Information and Learning Company. 2007, 48 pages.

Tang et al., "Parallelization Strategies for Rapid and Robust Evolutionary Multiobjective Optimization in Water Resources Applications." Advances in Water Resources. 2006, 1-39.

Van Veldhuizen et al., "Considerations in Engineering Parallel Multiobjective Evolutionary Algorithms." IEEE Transactions on Evolutionary Computation. vol. 7, No. 2, Apr. 2003. 144-173.

Van Veldhuizen et al., "(Final Draft) TR-98-03 Multiobjective Evolutionary Algorithm Research: A History and Analysis" Oct. 14, 1998; pp. 1-30.

Ventura et al.; "JCLEC: a Java framework for evolutionary computation"; 2007; Springer-Verlag; pp. 381-392.

Zimmer et al., "Utilizing Evolutionary Algorithms for Problems with Vast Infeasible Regions and Expensive Function Evaluations." The Aerospace Corporation. Jun. 27, 2008, 12 pages.

Office Action for U.S. Appl. No. 14/963,870, dated Oct. 3, 2018, Thompson et al, "Systems and Methods for Multi-Objective Evolutionary Algorithms with Soft Constraints", 28 pages.

Office Action for U.S. Appl. No. 15/094,521, dated Nov. 29, 2018, Thompson et al, "Systems and Methods for Multi-Objective Heuristics with Conditional Genes", 26 pages.

Final Office Action dated Oct. 21, 2019 for U.S. Appl. No. 15/267,528 "Systems and Methods for Multi-Objective Optimizations with Objective Space Mapping" Thompson, 32 pages.

Chootinan et al, "Constraint Handling in Genetic Algorithms Using a Gradient-Based Repair Method," Mar. 14, 2005, Computers & Operations Research, 33: 2263-2281.

Dauphin et al, "Identifying and Attacking the Saddle Point Problem in High-Diminesional Non-Convex Optimization," 2014, In Advances in Neural Information Processing Systems, vol. 27, 9 pages.

Farmani et al, "Self-Adaptive Fitness Formulation for Constrained Optimization", Oct. 2003, IEEE Transactions on Evolutionary Computation, 7(5):445-455.

Ishibuchi et al, "A Multi-Objective Genetic Local Search Algorithm and Its Application to Flowshop Scheduling," Aug. 1998, IEEE Transactions on Systems, Man, and Cybernetics—Part C: Applications and Reviews, 28(3): 392-403.

Office Action dated Apr. 26, 2019 for U.S. Appl. No. 15/268,840 "Systems and Methods for Multi-Objective Optimizations with Decision Variable Perturbations" Thompson, 23 pages.

U.S. Office Action for U.S. Appl. No. 15/267,528, dated Nov. 19, 2020, Thompson, "Systems and Methods for Multi-Objective Optimizations with Objective Space Mapping", 41 Pages.

Vitingerova, Zuzana, "Evolutionary Algorithms for Multi-Objective Parameter Estimation", Czech Technical University in Prague, Faculty of Civil Engineering, Doctoral Thesis, Jun. 2010, 108 pgs.

Office Action for U.S. Appl. No. 15/267,528, dated Aug. 11, 2021, Thompson, "Systems and Methods for Multi-Objective Optimizations with Objective Space Mapping", 47 Pages.

Brockoff, et al., "Tutorial on Evolutionary Multiobjective Optimization", GECCO, 2015, 27 pgs.

U.S. Office Action for U.S. Appl. No. 15/267,528, dated Mar. 21, 2022, Thompson, "Systems and Methods for Multi-Objective Optimizations with Objective Space Mapping", 54 Pages.

Zitzler, et al., "A Tutorial on Evolutionary Multiobjective Optimization", Springer, 2004, 37 pgs.

\* cited by examiner

PROGRESSIVE OBJECTIVE ADDITION IN MULTI-OBJECTIVE HEURISTIC SYSTEMS AND METHODS

FIELD OF THE DISCLOSURE

Aspects of the disclosure are related generally to multi-objective heuristics based optimization, and more particularly to systems and methods for progressive addition of objectives of optimization problems.

BACKGROUND OF THE DISCLOSURE

Large-scale multi-objective optimization heuristic systems and methods may be deployed for a relatively large number of objectives to be optimized. In many cases, when there are a relatively large number of objectives, the optimization may fail in providing a solution due to any variety of failure mechanisms. Furthermore, when heuristically solving problems with a relatively large number of objectives, the heuristic methods and systems may be burdened with a relatively large number of archived and/or intermediate solutions.

BRIEF DESCRIPTION OF THE DRAWINGS

Reference will now be made to the accompanying drawings, which are not necessarily drawn to scale, and wherein.

DETAILED DESCRIPTION

Figure 1:
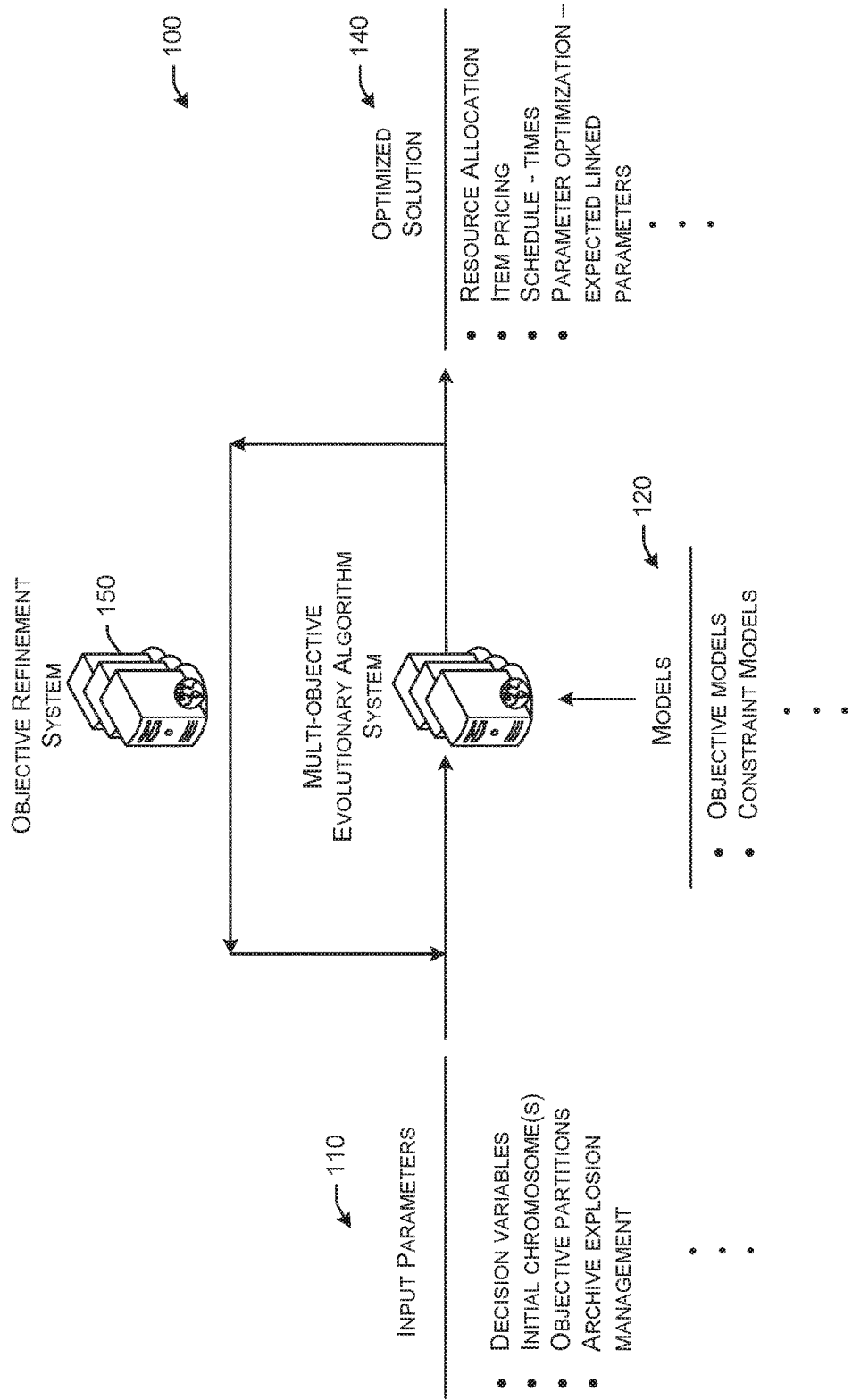
FIG. 1 is a schematic diagram that illustrates an example optimizing system in the form of a multi-objective evolutionary algorithm (MOEA) system with objective refinement and with input parameters and outputs of optimized solutions based on one or more objective models and/or constraint models, in accordance with example embodiments of the disclosure.

Embodiments of the disclosure now will be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Example embodiments of the disclosure may include objective refining systems and methods of a multi-objective evolutionary algorithms (MOEAs) system. These object refining mechanisms may enable heuristic optimization algorithms, such as MOEAs, that can optimize according to a relatively large number of objectives. Additionally, example embodiments may include systems and methods for managing solution archives, particularly solution archives that store non-final potential solutions between separate populations of an optimization. These solution archives, in example embodiments, may be managed in a fashion such that there are a relatively manageable number of potential solutions between populations of the heuristic optimization. These archive management mechanisms and/or algorithms may be implemented, in example embodiments, to prevent archive explosion, such that solution archives of the heuristic system do not grow to a size such that they become unwieldy. These archive management mechanisms, as described herein, may include, for example, any combination of n-arity non-domination sorting and/or selection, augmented cross-over algorithms, such as gene hinting, and/or fine-grain mutations, same epsilon cell non-domination, and/or resilient seeding. In some example embodiments, any one or more of the archive management techniques may be used independently, or alternatively, in conjunction with the objective refining mechanisms. In some cases, heuristic methods applied to optimization problems with relatively number of objectives may result in archive explosion, and therefore, one or more of the archive management mechanisms, as described herein, may be utilized to mitigate archive explosion in optimization problems with a relatively large number of objectives.

Evolutionary algorithms have been described in a variety of other publications including commonly owned U.S. Pat. No. 8,433,662 (application Ser. No. 12/550,858), filed on May 12, 2010 and titled "Systems and Methods for a Core Management System for Parallel Processing of an Evolutionary Algorithm" and commonly owned U.S. Pat. No. 8,560,472 (application Ser. No. 12/895,310), filed Sep. 30, 2010 and titled "Systems and Methods for Supporting Restricted Search in high-Dimensional Spaces," the contents of which, in their entirety, are incorporated herein by reference.

In example embodiments, multiple objectives of an optimization problem may be identified. The objectives may represent the goals that are to be achieved by implementing the results of the optimization problem. These goals may be, for example, may include multiple parameters and/or metrics associated with an implementation of the optimized solution, where the objectives may be in the form of maximizing, minimizing, or numerically targeting each of the parameters and/or metrics. The heuristic multi-objective optimization solution may provide a value for a number of decision variables that may be implemented to achieve the predicted results of the optimization. For example, in an optimization problem for optimizing and implementing an airline schedule for a major airline, decision variables may the departure times of every flight on the network, and the objectives may include maximizing revenue, maximizing profit, minimizing departure delays, minimizing arrival delays, minimizing fuel usage, maximizing a customer satisfaction metric, etc. As the number of objectives increase, the optimization problem may be increasingly intractable, and may require increasing levels of resources, such as processing bandwidth and/or storage bandwidth, etc.

According to example embodiments of the disclosure, with the complete set of objectives identified for a particular optimization problem, the objectives may be divided into subsets of objectives. A series of optimizations may be performed for one or more of the subsets of objectives. The results (e.g., one or more set of decision variables (e.g., chromosome)) of each of the optimizations with subsets of the complete set of objectives may be used as the starting point for the next optimization with a modified set of objectives. In this way, a more tractable number of objectives may be used for the earlier optimizations in the sequence of optimizations performed, and in later optimizations a better starting point may facilitate the optimizations with a larger number of objectives. In some example embodiments, this type of a sequential approach with a restricted and/or controlled introduction of objectives over a series of connected optimization runs may result in some multi-objective problems that were previously unsolvable to be solvable. Indeed, it will be appreciated that the solving of some previously intractable optimization problems may be possible using the sequential optimization processes with controlled introduction of objectives, as discussed herein, as compared to performing a single optimization using all of the objectives that are to be optimized. It will further be appreciated that performing multi-objective heuristic optimization using the processes and mechanisms described herein may be more resource efficient (e.g., require less computer processing bandwidth, require less storage/memory resources, require less processing time, etc.) compared to performing a single stage optimization to optimize to a full set of objectives.

In some example embodiments, sequential optimization runs may progressively increase the number of the subset of objectives used in the optimization. In these example embodiments, the subsets of objectives may be additive and the final optimization run may perform an optimization according to the complete set of objectives. For example, the complete set of objectives may be separated into three subsets of objectives and a first optimization run may optimize to the first subset of objectives, a second optimization run may optimize to the first subset and the second subset of objectives, and a third and final optimization may optimize according to all three subsets of objectives, or in other words all of the objectives of the optimization problem. In this example, a number of chromosomes (e.g., pareto-optimized chromosomes according to the firs subset of objectives) from the first optimization run may be used as the starting point for the second optimization run, and similarly, a second number of chromosomes (e.g., pareto-optimized chromosomes according to the first and second subsets of objectives) from the second optimization run may be used as the starting point for the third optimization run. In this way, the learning from the previous optimization run may make the subsequent optimization run more feasible for solving and/or more easily solved, ultimately culminating in a more tractable solution to the optimization according to all of the desired objectives. The transition from one run to the subsequent run may be based at least in part on a steering event. The steering event may be, for example, any type of indication of convergence of the optimization with the current set of objectives (e.g., current collection of objective subsets). For example, between generations of solutions with a fixed set of objectives, if the pareto-front is not advanced for a predetermined number of generations, then a steering event (e.g., change in objectives) may be implemented.

In some other embodiments, the successive optimization runs may include overlapping or non-overlapping subsets of the objectives to which to optimize. Again in these example embodiments, solutions (e.g., a predetermined number of the best chromosomes) from the previous run may be used as the starting point of the subsequent optimization run. The final optimization run may still perform the heuristic optimization according to the complete set of objectives. In some example embodiments, the series of optimizations that are run may use an overlapping sliding mechanism to select objectives to optimize to for the sequence of optimization runs. In other example embodiments, a series of non-overlapping optimizations (e.g., no two of the non-final optimizations will optimize for the same objective). In either of the overlapping or non-overlapping series of optimizations, a final optimization may use the results from each of the restricted optimizations as a starting point solution. It will further be appreciated that some steering events (e.g., change in objectives from one optimization to the next) may be overlapping (e.g., contain at least one objective from the previous optimization) and non-overlapping (e.g., not contain any of the same objectives from the previous optimization).

The systems and methods, as disclosed herein, may make use of a static set of decision variables (e.g., structured as genes of a chromosome) or a variable set of decision variables that may change as the set of optimization objectives change. In other words, all of the decision variables that correspond to all of the objectives may be present in the chromosomes that are used for the any of the optimizations performed with subsets of the full set of objectives. Alternatively, the chromosomes may be augmented and/or changed progressively between steering events where an optimization is performed according to a new set and/or additional objectives compared to the previous restricted optimization.

It will be appreciated that when using a relatively large set of objectives, even when using an epsilon space-based evaluation of non-domination of potential solutions, there is a potential to generate a relatively large number of potential non-dominated solutions to be used in subsequent connected runs. In some cases, the large number of non-dominated solutions may result in archive explosion that may lead to the optimization becoming unwieldy. Processes and systems are discussed herein that, cull, prevent the generation of, tier or rank order, or otherwise reduce the number of non-dominated solutions that may be archived between connected runs of the MOEA system. For the purposes of this discussion when a chromosome is non-dominated, that chromosome solution performs better than all of the other chromosomes in the current population according to at least one objective. When assessing to non-domination according to epsilon space non-domination, the objective space (e.g., hyperdimensional space) may be partitioned into equal segments and only one (or a predetermined number of) non-dominated solutions may be permitted in each epsilon space. By doing so, a large number of tightly concentrated solutions may be prevented, especially when those tightly concentrated solutions may not provide sufficient genetic diversity for subsequent generations of solutions. However, when the objective space increases in dimensionality, the pareto-front may be along a relatively large number of epsilon spaces, such that the number of solutions archived and used and/or bred in the subsequent generation may be become unwieldy. Thus, processes and mechanisms to prevent archive explosion are discussed herein. These mechanisms of archive management may be used independently of or in conjunction with the steering based progressive objective mechanisms.

According to example embodiments, one form of archive management may be n-arity tiered non-domination testing. With n-arity non-domination, a domination check of a particular chromosome may consider how many objectives the particular chromosome may outperform all other feasible chromosomes in the current generation. So, if the chromosome outperforms all other feasible chromosomes of that generation in three different objectives, then the chromosome would be 3-arity non-dominated. When performing selection operations in the MOEA, according to example embodiments, the higher-arity chromosomes may have an advantage over other chromosomes in being selected for the purposes of producing child chromosomes. In example embodiments, higher-arity chromosomes may be given priority for the purposes of archiving into subsequent populations.

According to further example embodiments, another archive management mechanism may include resilient seed discovery, where the epsilon space dimensions may be increased to reduce the number of non-dominated solutions. However, to not discard potentially useful solutions, various techniques may be used to select some resilient chromosomes, such that more than one chromosome may be selected from a particular epsilon space. For example, a first chromosome in a particular epsilon space (e.g., expanded epsilon space) may be selected based on determining the Euclidean distance of each of the chromosomes within that epsilon space to the utopia corner (e.g., the most optimal corner according to the objective dimensions of the epsilon space). If that epsilon space contains a second chromosome that may be more optimal than the first chromosome in one or more objectives, although it is not the closest to the utopia corner of that epsilon space, then that second chromosome may also be archived and used to seed the next generation of solutions to evaluate. In this way, a larger epsilon space may be accommodated, without sacrificing potentially useful genetic material, and without causing archive explosion. In some example embodiments, the same-cell chromosome sorting techniques, as described above may be applicable to a cell-space other than an epsilon space. Indeed, in example embodiments, the same-cell techniques described here may apply to any space where chromosomes are to be identified for fitness and/or ranking.

In example embodiments, resilient seeds may be identified that are particularly good solutions as assessed according to the objectives of a particular optimization run. These resilient seeds may have particular genes that may be determined to be relatively good as determined by the ensuing one or more objective values. These resilient chromosomes and particular genes therein may be used as hinting genes as during crossover processes. The hinting genes may be involved in a crossover process where the hinting genes influence, along with the parent chromosomes, the corresponding genes of a child chromosome. In other words, for those particular genes, there may effectively be more than one parent. By doing this, high-quality genetic material may be more persistent and resilient in the population of chromosomes being evaluated.

In some further example embodiments, the gene flipping and/or fine-grain mutations may be implemented. These processes may further result in some resiliency in the genes that are identified as being particularly useful and result in relatively good performance according to the objectives to which the optimization is being performed.

It will be appreciated that the multi-objective problem may be any suitable multi-objective problem and the systems and methods, as described herein, may be applied to any suitable optimization problem, such as ones with relatively large number of objectives for which to optimize. In some example embodiments, the systems and methods as described herein may enable optimization problems with 15 or more objectives. In some example embodiments, the systems and methods as described herein may enable optimization problems with 15 or more objectives, and 500 or more decision variables. In some example embodiments, the systems and methods as described herein may enable optimization problems with 15 or more objectives, 500 or more decision variables, with relatively high constraints (e.g., high levels of infeasibility of potential solutions). In some example embodiments, the systems and methods as described herein may enable optimization problems with 15 or more objectives, and 2000 or more decision variables. In some example embodiments, the systems and methods as described herein may enable optimization problems with 15 or more objectives, and 2000 or more decision variables, with relatively high constraints. In some example embodiments, the systems and methods as described herein may enable optimization problems with 40 or more objectives. In some example embodiments, the systems and methods as described herein may enable optimization problems with 40 or more objectives, and with relatively high constraints. In some example embodiments, the systems and methods as described herein may enable optimization problems with 80 or more objectives. In some example embodiments, the systems and methods as described herein may enable optimization problems with 80 or more objectives, and with relatively high constraints. In some example embodiments, the systems and methods as described herein may enable optimization problems with 100 or more objectives. In some example embodiments, the systems and methods as described herein may enable optimization problems with 100 or more objectives, and with relatively high constraints.

It should further be appreciated that the systems and methods, as described herein may be applied to any suitable type of optimization problem. Such an optimization problem may include, but is not limited to, pricing optimization, parameter optimization, timing optimization, combinations thereof, or the like.

It will be appreciated that the systems and methods, as described herein, may be configured, in example embodiments, for any variety of suitable optimization problems, including. Pricing problems may include optimizations of prices of any suitable goods or services including, but not limited to, tickets, hotel rooms, investment products, insurance products, consumer goods, industrial goods, services, combinations thereof, or the like. For example, pricing problems may include optimizing the price of different types of hotel rooms for a hotel chain, different type of seats of various flights for an airline, different type of insurance products targeted to various insurance clients for an insurance company, different types of client services targeted to various investors of an investment firm, product pricing of various models and trims of cars manufactured and sold by car companies, or the like. Indeed, it will be appreciated that any type of pricing problem may be applied to the systems and methods, as described herein. In such pricing problems, items such as non-deployed time, cancellations, vacancies, overbooking, consumable usage, maintenance, revenues, costs, profits, return on capital (ROC), return on investments (ROI), combinations thereof, or the like may be optimized. In some example embodiments, the systems and methods, as described herein, may be particularly suited for solving pricing optimization problems with relatively large numbers of objectives.

Parameter optimization problems may entail optimizations of any suitable parameters including, but not limited to, production parameters, engineering parameters, temperature settings, humidity settings, illumination settings, power settings, frequency settings, amplitude settings, process time settings, mixture proportions, combinations thereof, or the like. In manufacturing based examples, a variety of factory-based manufacturing parameters of various manufacturing equipment may be optimized for any variety of objectives, such as manufacturing yield and/or manufacturing throughput, etc. In example embodiments, the systems and methods, as described herein, may be particularly suited for solving multi-objective manufacturing optimization problems with a relatively large number of objectives.

It will be appreciated that the systems and methods, as described herein, may be configured, in example embodiments, for any variety of suitable optimization problems. For example, scheduling problems may include optimizing the scheduling of various services associated with transportation, delivery courier, logistics, just-in-time manufacturing, combinations thereof, or the like. In such problems, items such as delivery times, arrival delays, non-deployed time, maintenance time, consumable usage, maintenance, revenues, costs, profits, return on capital (ROC), return on investments (ROI), combinations thereof, or the like may be optimized. Indeed, it will be appreciated that any type of scheduling problem may be applied to the systems and methods, as described herein. In example embodiments, these types of problems may be prone to a variety of weather, emergency, and/or asset/infrastructure impairment related irregular operations. In some example embodiments, the systems and methods, as described herein, may be particularly suited for solving optimization problems with a relatively high number of objectives. Timing optimization problems may include timing and/or scheduling of any suitable set of events including, but not limited to, event planning, train schedules, airline schedules, rental schedules, university class scheduling, combinations thereof, or the like.

In one non-limiting example, an optimization may be for a schedule of flights, times, and routes within a network of an airline. In this case, the stakeholder may be the airline and the multiple objectives may be any variety of general or industry specific considerations, such as revenue, profitability, fuel consumption, ground time, load factor, equipment non-utilization time, customer satisfaction metrics, on-time departures, lost bags, on-time arrivals, accumulated delays, cost of delays, cost of weather related schedule laxity, airport fees, combinations thereof, or the like. The previous set of objectives are only representative list, and it would be appreciated that an optimization may, indeed, have many more objectives to which to optimize. In some example embodiments, the number of these objectives may be so great that performing a multi-objective evolutionary algorithm using all of the objectives contemporaneously may result in an inability to perform the optimization, or an unreasonably long time to perform the optimization. As a result the airline, or those performing the optimization on their behalf, may optimize for the various objectives in a sequential manner. For example, the airline may perform a first partial-optimization using the objectives of revenue, profitability, fuel consumption, and ground time. This first partial-optimization may be performed until a convergence and/or steering event with this reduced set of objectives is achieved. Then the airline may perform a second partial-optimization using the chromosomes from the first partial-optimization as the starting point, and using the objectives of revenue, profitability, fuel consumption, ground time, load factor, equipment non-utilization time, customer satisfaction metrics, on-time departures, and lost bags. Next, once a convergence and/or steering event is achieved in the second partial-optimization, the results from the second partial-optimization may be used as a starting point of a third and final optimization according to all of the objectives of revenue, profitability, fuel consumption, ground time, load factor, equipment non-utilization time, customer satisfaction metrics, on-time departures, lost bags, on-time arrivals, accumulated delays, cost of delays, cost of weather related schedule laxity, airport fees.

As an alternative to the previous example, it will be appreciated that the steering event-based changes to the sequence of partial-optimizations may be non-additive with respect to objectives. In other words, each of the partial-optimizations may not contain all of the objectives from the immediately preceding partial-optimization. In the following example, the objectives optimized to in series of partial-optimizations are completely non-overlapping until the final full-optimization. In one non-limiting example, the airline may perform a first partial-optimization using the objectives of revenue, profitability, fuel consumption, and ground time. The airline may next perform a second partial-optimization, with or without using the chromosomes from the first partial-optimization as the starting point, and according to load factor, equipment non-utilization time, customer satisfaction metrics, and on-time departures. The airline may next perform a third partial-optimization, with or without using the chromosomes from the first and/or the second partial-optimization as the starting point, and according to lost bags, on-time arrivals, accumulated delays, cost of delays, cost of weather related schedule laxity, and airport fees. Finally, the heuristic system may be employed to perform a fourth and final full optimization using any or all of the first, second, and/or third solutions as a starting point and according to all of the objectives of revenue, profitability, fuel consumption, ground time, load factor, equipment non-utilization time, customer satisfaction metrics, on-time departures, lost bags, on-time arrivals, accumulated delays, cost of delays, cost of weather related schedule laxity, and airport fees.

As an alternative to the previous example, it will be appreciated that the steering event-based changes to the sequence of partial-optimizations may be non-additive, but partially overlapping with respect to objectives. In other words, each of the partial-optimizations may not contain all, but may include some, of the objectives from the immediately preceding partial-optimization. In the following example, the objectives optimized to in series of partial-optimizations are partially overlapping until the final full-optimization where all of the objectives are considered. In one non-limiting example, the airline may perform a first partial-optimization using the objectives of revenue, profitability, fuel consumption, ground time, and load factor. The airline may next perform a second partial-optimization, using the optimized chromosomes from the first partial-optimization as the starting point, and according to revenue, load factor, equipment non-utilization time, customer satisfaction metrics, and on-time departures. The airline may next perform a third partial-optimization, using the optimized chromosomes from the second partial-optimization as the starting point, and according to revenue, equipment non-utilization time, lost bags, on-time arrivals, accumulated delays, and cost of delays. The airline may next perform a fourth partial-optimization, using the optimized chromosomes from the third partial-optimization as the starting point, and according to, lost bags, on-time arrivals, accumulated delays, cost of delays, cost of weather related schedule laxity, and airport fees. Finally, the heuristic system may be employed to perform a fifth and final full optimization using fourth partial-optimization chromosome solutions as a starting point and according to all of the objectives of revenue, profitability, fuel consumption, ground time, load factor, equipment non-utilization time, customer satisfaction metrics, on-time departures, lost bags, on-time arrivals, accumulated delays, cost of delays, cost of weather related schedule laxity, and airport fees. Indeed, it should be appreciated form the previous examples that according to example embodiments of the disclosure, any number of partial-optimizations may be performed with any suitable combination of objectives to which to optimize as a build-up to the final optimization that includes all of the desired objectives being considered.

In some example embodiments, decision variables (e.g., genes of a chromosome structure) may be built-up from one partial optimization to the next partial, or full, optimization, without any changes in the objectives used in these subsequent optimizations. Thus, in these example embodiments, a build-up of decision variables may be used, with a fixed set of objectives, to make a multi-objective optimization problem more tractable. The learning (e.g., pareto-optimized chromosomes) from one partial optimization may be applied as a starting point for a subsequent optimization (e.g., partial or final, full optimization). In some example embodiments, attempting an optimization with all of the decision variables, without a build-up over one or more partial optimizations may result in an optimization problem that is intractable or uses a relatively high level of compute resources.

FIG. 1 is a schematic diagram that illustrates an example optimizing system 100 in the form of a multi-objective evolutionary algorithm (MOEA) system 130 with objective refinement 150 and with input parameters 110 and outputs of optimized solutions 140 based on one or more objective models and/or constraint models 120, in accordance with example embodiments of the disclosure. While a particular configuration of the optimizing system 100 is depicted herein, it will be appreciated that the configuration may vary depending on particular application of the MOEA system 130, according to various embodiments of the disclosure. Indeed, there may be any variety of input parameters 110, models 120, MOEA system 130, objective refinement 150, and/or optimized solutions 140.

The input parameters 110 may be any suitable set of parameters, including, in example embodiments, a listing of decision variables, such as decision variables and attributes of those decision variables. Decision variables may be the elements that may be thought of as arranged as genes in a chromosome (e.g., data elements in an array). The decision variables may be the elements that are optimized during an multi-objective optimization as performed by the MOEA system 130. These multi-objective optimizations may generate an optimized solution that may be implemented as a baseline implementation of a particular entity (e.g., airline network, factory, hotel chain operator, etc.). For example, in the context of a pricing problem, such as pricing hotel rooms, decision variables may include the price of each of the various types of rooms, where the types of the rooms may be described by the attributes of the decision variables. The attributes may include any variety of descriptors and/or parameters associated with a corresponding decision variables. These descriptors may be any variety of naming of the item or any type of parameters that may indicate any quality or naming of the items. For example, in reference to the previous example of the hotel rooms, the attributes may include descriptors of a particular element (e.g., type of hotel room). Such descriptors may include, for example, location, single occupancy, double occupancy, beach facing, garden facing, high floor, handicap access, suite, twin beds, king bed, combinations thereof, or the like. It will be appreciated that attributes may further serve as a mechanism to tag, name or otherwise refer to a particular decision variable among more than one (e.g., many) decision variable.

The input parameters 110 may further include information on how the objectives are to be partitioned such that the MOEA performs a series of connected optimization runs where all but the last optimization is performed according to all of the objectives. Thus, the input parameters 110 may, in example embodiments, indicate the progression of the partial-optimization runs, such as how many partial-objective set optimizations may be performed and what are the objectives included in each of the partial-objective optimization runs. The input parameters 110 may still further include parameters associated with algorithms that may be implemented to prevent archive explosion. Such parameters may include indicators of archive size, criteria for selecting resilient seeds, weights associated with fine-grain mutations and/or gene hinting, and/or resiliency criteria.

The models 120 may include objective model(s) and constraint model(s) that may be used by the MOEA system 130 for evaluating solutions according to the multiple objectives and determining constraints of solutions (e.g., infeasible solutions), respectively. The objective models may provide value(s) for any variety of objectives that may be optimized. For example, with pricing optimization problems, the objective model(s) may be used to evaluate potential solutions for objective performance such as total profit, total revenue, customer dissatisfaction metrics, probability of outselling the product, combinations thereof, or the like. The constraint models may provide value(s) for any variety of constraints that may be navigated in the constraint optimization mechanism. For example, with pricing optimization problems, the objective model(s) may be used to evaluate the total number of sales of a particular item at a particular price point. It will be appreciated that in some example embodiments, the number of objectives may be relatively large number. In some example embodiments, the number of objectives may be greater than 15. Some further example embodiments, the number of objectives may be greater than 30. In some yet further example embodiments, the number of objectives may be greater than 50. In still some further example embodiments, the number of objectives may be greater 75. In other example embodiments, the number of objectives may be greater than 100.

As shown, the result of optimization based on the input parameters 110 and by using the models 120, outputs 140 may be generated by the MOEA system 130. The outputs 140 may be one or more variables that are optimized in accordance with the models 120 by the MOEA system 130. For example, in a pricing optimization problem, the outputs may be an indication of a price or range of prices of various products (e.g., hotel rooms, airline flights, insurance products, investment products, types of mobile electronic devices, etc.) that do not violate any constraints, or at least minimizes constraint violations, while providing an optimized solution on the basis of the one or more objective functions. In some cases, the outputs 140 may include results of the sub-optimizations where the optimizations are performed according to partial or subset of objectives. Regardless of whether intermediary optimization results are displayed, the outputs 140 may indicate the results of the final optimization performed with a complete set of objectives and their respective objective functions, as included in the models 120.

As a non-limiting example, the results or output of a pricing optimization problem applied to hotel rooms may result in a king bed/beach facing room priced at $299 per night, a twin bed/beach facing room at $249 per night, a king bed/courtyard facing room at $199 per night, and a twin bed/garden facing room at $179 per night. This is by way of example only and it will be appreciated that, in example embodiments, there may be more than four elements to be priced. For example, a world-wide hotel chain may wish to price its rental rooms across all of its worldwide properties. In such an example, constraints may arise from the hotel chain, at least in the short run, having a fixed number of hotel rooms. As another example, an airline may wish to price all flights that it has on its network (e.g., 2000 daily sorties), including multi-leg flights. In such an example, constraints may arise from the airline, at least in the short run, having a fixed number of available seats for each seating class between any two cities. As yet another example, a consumer electronics company may wish to price its entire range of notebook computers, table computers, and smartphones with various trims and options. In such an example, constraints may arise from the consumer electronics company, at least in the short run, having a fixed manufacturing capacity across its line of products in shared manufacturing assets (e.g., factories).

In example embodiments, when outputs 140 or multi-objective optimized solutions are discussed, the objective values may be pareto-optimized. In this case, no single objective may be optimized at the cost of other of the multi-objectives. Instead, in example embodiments, the optimization front (e.g., in a multiple objective space) may be optimized as far as possible. When potential solutions are evaluated by the MOEA system 130, a non-domination test may be performed to identify solutions that may be used for generation of subsequent populations of solutions (e.g., child populations generated by crossover, selection, and/or mutation). In some example embodiments, non-dominated solutions, or otherwise solutions that are better than any previous solution with regards to at least one objective and no worse with regards to all objectives, may be propagated for child solutions.

In example embodiments, the output 140 may also include a variety of derivative outputs associated with the collection of pareto-optimized solutions or a single optimized solution. These derivative outputs may be an expected progression of metrics associated with an optimized solution. For example, the optimized solution may be for pricing of airline tickets (e.g., decision variables) and the derivative output (e.g., expected metrics) may be of the percentage of seats sold as a function of days till the flight. Such an expected output may be tracked to determine if an irregular operation has transpired, and if such an irregular operation has been detected, runtime re-optimization may be performed to accommodate any irregular operations.

The objective refinement system 150, or objective refinement mechanism, in example embodiments, may be configured to organize and drive a sequence of sub-optimizations performed by the MOEA system 130 that ultimately culminates in a final desired optimization. These sub-optimizations or partial-optimizations may each use a subset of the complete set of objectives to which the final optimization is to be performed to produce the optimized output 140. The object refinement system 150 may determine the number and/or sequence of objectives to apply in a series of partial-optimizations. In some example embodiments, each of the partial optimizations performed may generate a set of optimized decision variables according to the subset of objectives of that particular partial optimization. These optimized decision variables may be used as a starting point for one or more subsequent partial-optimizations and/or final full objective set optimization. The process of running these linked set of partial and full optimization may be managed by the objective refinement system 150.

In some example embodiments, the MOEA System 130 and the objective refinement system 150 may be co-located. In other example embodiments, the objective refinement system 150 may be located in a location separate from the MOEA system 130. For example, in example embodiments, the MOEA system may be a multi-core, massively parallel processing, mainframe, and/or a super-computer that may be located in a particular location and accessed by the objective refinement system 150, such as via one or more network(s), from a stakeholder's location. In other example embodiments, the objective refinement system 150 may be co-located with the MOEA system 130.

In example embodiments, the objective refinement system 150 may be any suitable user device including, but not limited to, a mobile phone, a smartphone, a tablet computing device, an electronic book (ebook) reader, wearable devices, smart watches, netbook computers, notebook computers, laptop computers, desktop computers, personal digital assistants (PDA), web-enabled televisions, video game consoles, set top boxes (STB), smart appliances, cameras, navigation systems, in-vehicle infotainment systems, combinations thereof, or the like. In other example embodiments, the objective refinement system may be implemented as part of and/or combined with the MOEA system 100.

The objective refinement system 150 may be configured to manage a series of partial optimizations, where the partial optimizations are each performed with a subset of the total objectives of the optimization problem. The objective refinement system 150 may, based at least in part on input parameters 110 and models 120, be configured to partition objectives into different subsets and then launch a series of partial optimizations. The objective refinement system 150 may further be configured to determine if the for a particular partial optimization problem, the optimization has sufficiently converged to an optimized pareto-front to engage in a steering event, or otherwise move to the next partial optimization, or in the case of the last partial optimization, move to the final and full objective set optimization.

Figure 2:
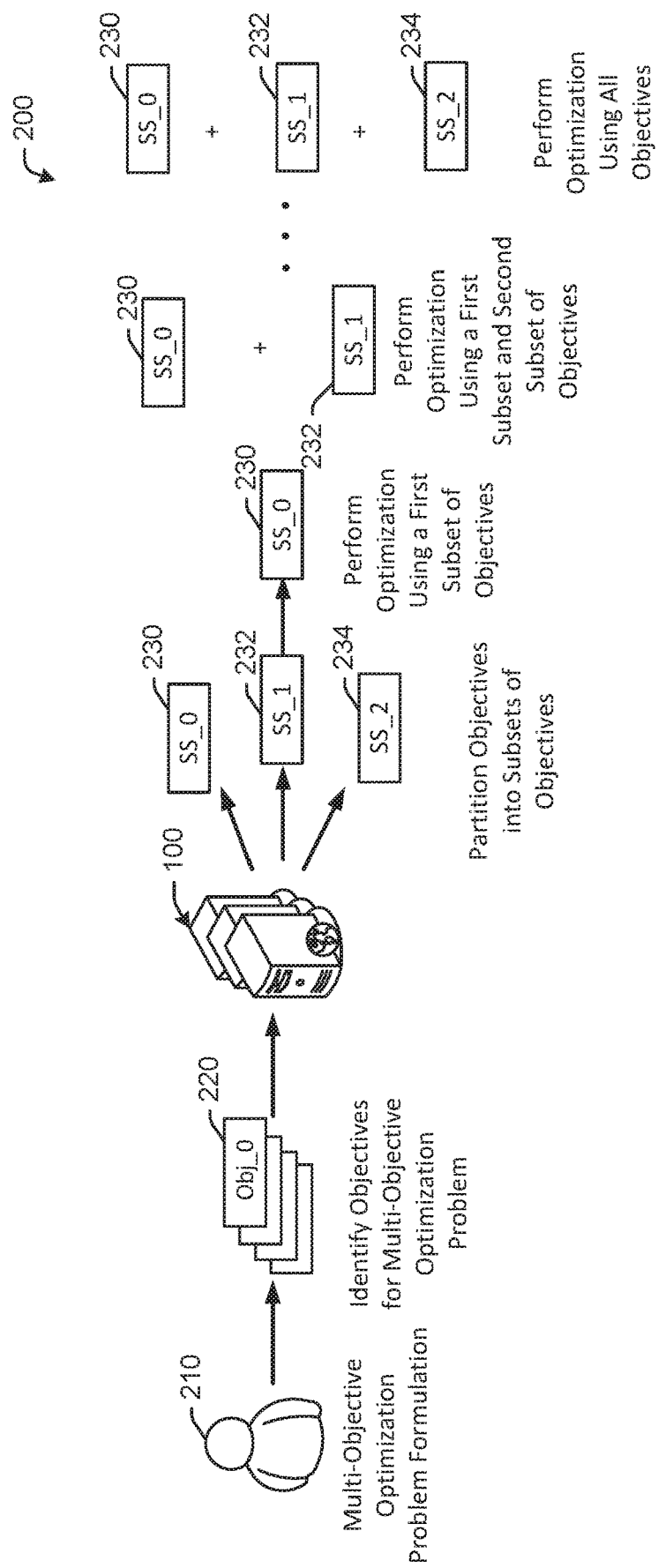
FIG. 2 is a schematic diagram that illustrates an example mechanism by which the optimization system of FIG. 1 partitions a collection of objectives into subset of objectives and performing more than one optimizations using various subsets of the objectives for each of the optimizations, in accordance with example embodiments of the disclosure.

FIG. 2 is a schematic diagram that illustrates an example mechanism 200 by which the optimization system 100 of FIG. 1 partitions a collection of objectives 220 into subset 230, 232, 234 of objectives and performing more than one optimizations using various subsets of the objectives for each of the optimizations, in accordance with example embodiments of the disclosure. As shown, a stakeholder 210 may provide the complete set of objectives 220 that he/she cares about in the system or process that he/she is trying to optimize. The optimization system 100 may receive the indication of the objectives 220, such as in the form of objective models of the inputs 120. Although a particular number of objectives 220 are depicted, it will be appreciated that there may be any suitable number of objectives to which an optimization is to be performed. In some example embodiments, the number of objectives 220 may be such that attempting to optimize according to the objectives 220 in a single pass (e.g., without a series of partial-optimizations) of the MOEA 130 may result in an optimization problem that may be intractable and/or those that use a relatively high level of resources (e.g. processing power, processing time, memory, etc.).

The optimization system 100, such as at the objective refinement system 150 may, after receiving the objectives 220, may partition the objectives 220 into two or more subsets of objectives 230, 232, 234. In some example embodiments, the number of subsets and/or which objectives to include in each of the subsets may be specified by the input parameters 110. Although three subsets 230, 232, 234 are depicted here, it will be appreciated that there may be any suitable number of subsets of objectives. In some example embodiments, each of the subsets 230, 232, 234 may have equal numbers of objectives 220, and in other example embodiments one or more of the subsets 230, 232, 234 may include a dissimilar number of objectives 220. In some example embodiments, the subsets 230, 232, 234 may be at least partially overlapping (e.g., more than one subset 230, 232, 234 may share at least one of the same objective 220). The mechanism 200 may perform a first partial optimization with a first subset 230 of the objectives. Using the results (e.g., optimized solutions according to the objectives of the first partial optimization) as a starting point, a second partial optimization may be performed using the first subset 230 and the second subset 232 of objectives 220. Finally, a final optimization including all of the objectives 220 may be performed using the results of the second partial optimization (e.g., non-dominated chromosomes on the pareto-front according to the objectives 220 of the first and second subsets 230, 232) as a starting point. The final optimization in accordance with all of the objectives 220 may provide the stakeholder 210 with the optimization results that he/she may desire. The stakeholder and/or the optimization system 100, at this point may physically implement (e.g., set a flight schedule, price tickets, provide manufacturing parameter setpoints, etc.) the optimized solution from the final optimization with all of the objectives 220. All though a three stage additive mechanism 200 is described here, it will be appreciated that there may be any number of partial optimization stages and/or any procession of introduction of subsets 230, 232, 234 and/or objectives 220.

In example embodiments, the set of decision variables for each of the partial optimizations may remain fixed throughout. In other words, in these embodiments, the decisions variables (e.g., genes of the chromosome data structures) associated with all of the objectives 220 may be available for each of the partial optimizations, even though some of the genes may not pertain to the current partial optimization. In other embodiments, the chromosomes (e.g., the genes of the chromosome) may change from one partial optimization to the next based at least in part on which objectives are included in a particular partial optimization. Thus, in these embodiments the first partial optimization may have chromosomes with genes that are associated with only the objectives of the first subset 230 of objectives and when performing the second partial optimization with the first and second subsets 230, 232 of objectives, the chromosomes from the first partial optimization may be augmented with additional genes that may pertain to additional objectives that may be included in the second subset 232.

Figure 3:
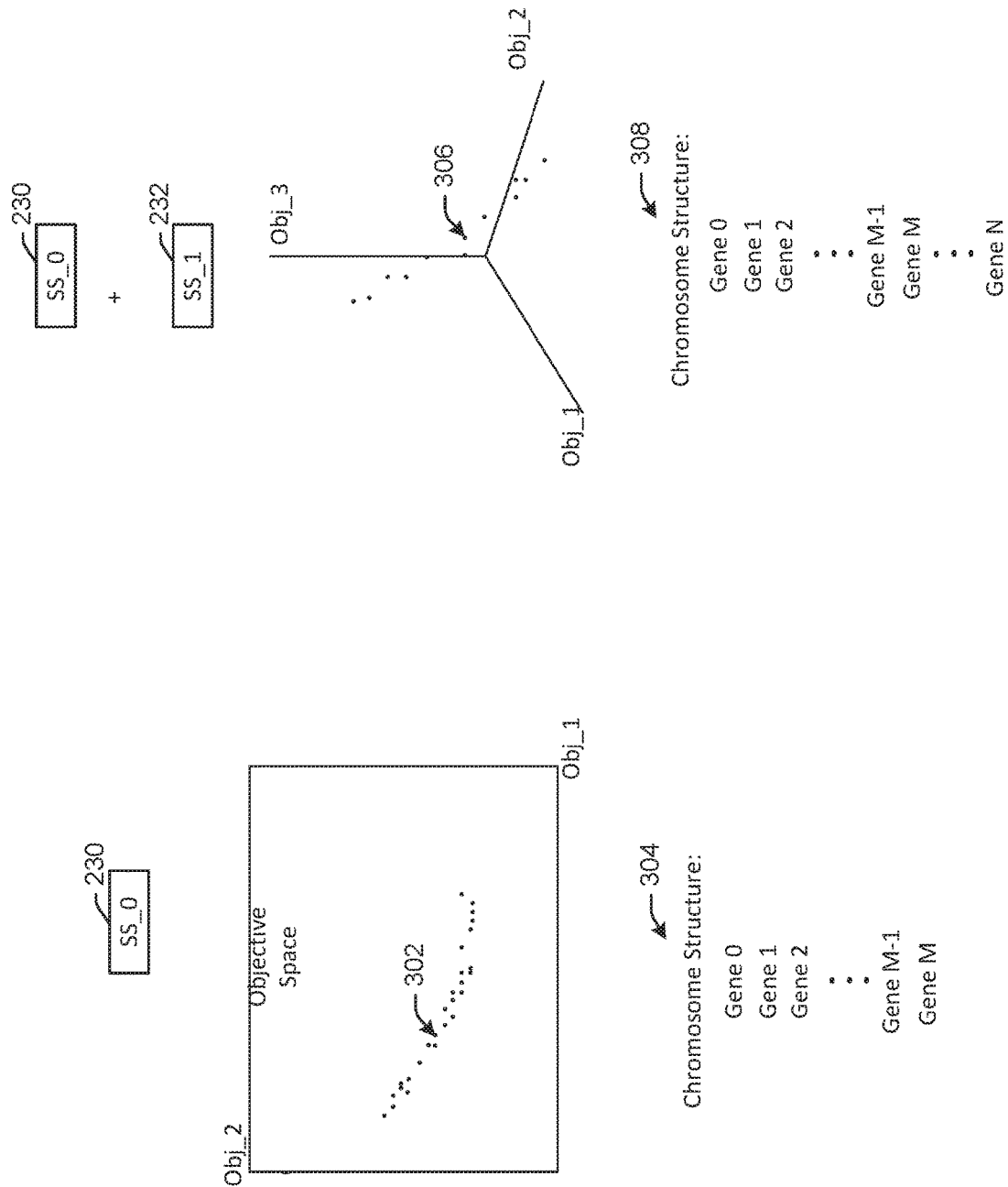
FIG. 3 is a schematic diagram illustrating a build-up of objectives in subsequent heuristic multi-objective optimizations, such as optimizations performed by the MOEA system of FIG. 1, in accordance with example embodiments of the disclosure.

FIG. 3 is a schematic diagram illustrating a build-up of objectives in subsequent heuristic multi-objective optimizations 302, 306, such as optimizations performed by the MOEA system 130 of FIG. 1, in accordance with example embodiments of the disclosure. The first partial optimization, as shown as a non-limiting example here, may be according to Objective 1 and Objective 2. These two objectives, may be part of the first subset 230 of the objectives. The pareto-front of this optimization 302, representing non-dominated chromosome solutions to the optimization using the objectives (e.g., Objective 1 and Objective 2) of the first subset 230 may have a genetic (e.g., data) structure 304. Thus the genes of this chromosome structure 304, as a non-limiting example, may range from gene 0 to gene M. When a second partial optimization is performed with the first subset 230 and the second subset 232, a pareto-front 306 may be determined. In this case, the second subset 232 may include Objective 3. In this second partial optimization, the chromosome 304 may be enhanced with additional genes to be chromosome 308. Chromosome 308 may include additional genes (e.g., gene M+1 to gene N) that are associated with Objective 3 of the second subset 232. In this non-limiting example, the first subset 230 was depicted with two objectives and the second subset 232 for the ease of depicting two-dimensional and three-dimensional results relative to hyper-dimensional results. It will, however, be appreciated that the first and second subsets 230, 232 may contain more than 2 and 1 objectives, respectively, and in some cases, may include a relatively large number of objectives.

Figure 4:
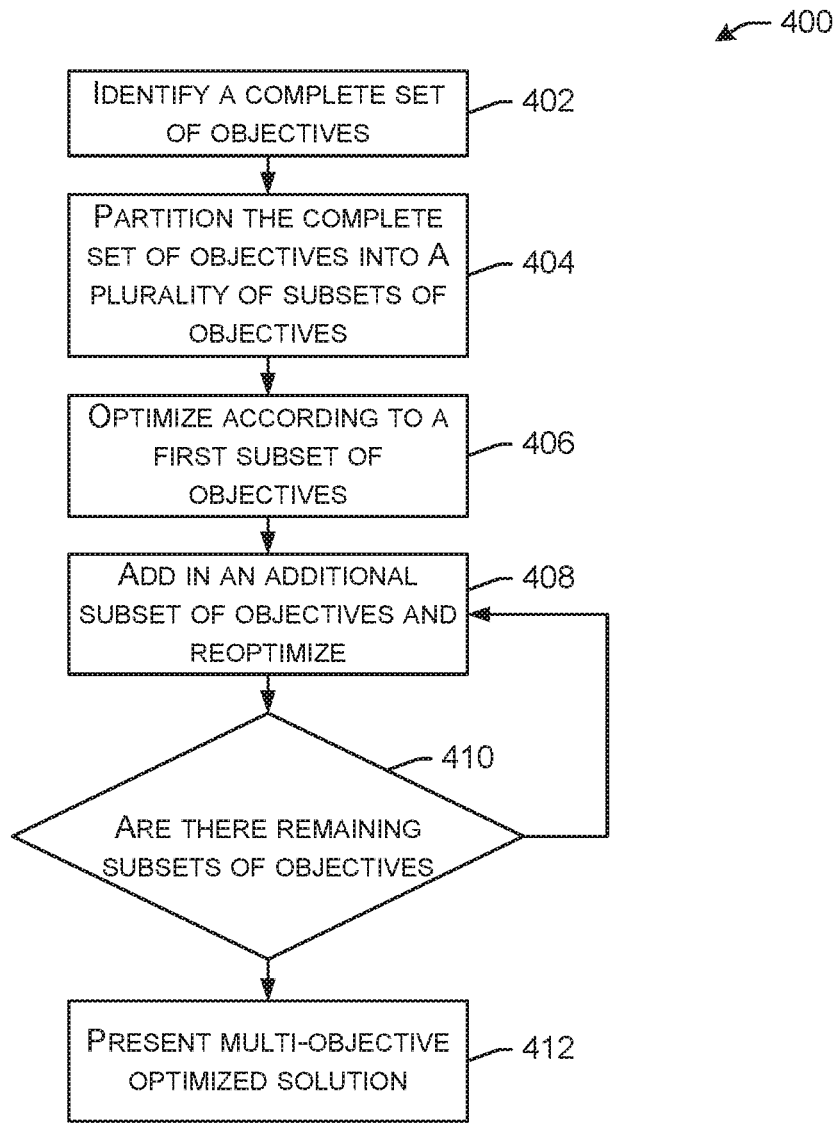
FIG. 4 is a flow diagram illustrating an example method for applying a variable set of objectives to solve a multi-objective problem with a relatively large number of objectives, in accordance with example embodiments of the disclosure.

FIG. 4 is a flow diagram illustrating an example method 400 for applying a variable set of objectives to solve a multi-objective problem with a relatively large number of objectives, in accordance with example embodiments of the disclosure. The method 400 may be performed by the optimization system 100 with the objective refinement system 150, as depicted in FIG. 1. This method 400 may include the processes of the mechanisms discussed in conjunction with FIGS. 2 and 3 with additive subsets of objectives in a series of partial optimizations that culminate in a final optimization using all of the objectives to which an optimization is desired.

At block 402, a complete set of objectives may be identified. In some example embodiments, the number of objectives may be relatively large. For example, in some cases, the number of objectives may exceed 30 objectives. In some other cases, the number of objectives may exceed 70 objectives. In some further cases, the number of objectives may exceed 100 objectives. In example embodiments, the number of objectives may be such that attempting to perform a single MOEA optimization according to all of the objectives may result in an intractable optimization problem and/or a relatively high impairment of computing resources. In some example embodiments, the objectives of the optimization problem may be specified in the input parameters 110 to the optimization system 100.

At block 404, the complete set of objectives may be partitioned into a plurality of subsets of objectives. Each of the subsets of objectives may be overlapping, partially overlapping, or non-overlapping set of objectives. How the objectives may be separated into subsets may, in example embodiments, be specified in the input parameters 110 to the optimization system 100. At block 406, an optimization according to a first subset of objectives may be performed. This optimization is a partial optimization, since a subset of the complete set of objectives has been used for performing the optimization.

At block 408, an additional subset of objectives may be added and a further reoptimization may be performed with the objectives of all of the subsets of objectives. At block 410, it may be determined if there are any remaining subsets of objectives. If it is determined that there are remaining subsets of objectives, then the method may return to block 408 to add an additional subset of objectives and perform a new partial optimization. If, however, at block 410, it is determined that there are no additional objectives remaining, then at block 412, a multi-objective optimized solution to the optimization problem may be presented.

It will be appreciated that in some example embodiments, the series of optimizations may use a fixed-dimension chromosome structure, where all the genes associated with all of the objectives are present in the chromosome structure for all of the partial optimizations. In other example embodiments, it will be appreciated that the decision variables (e.g., genes of a chromosome structure) may change with steering events. In this case, each time, or some time, when new objectives are added to a partial or final full optimization, the chromosome structure may be expanded to add additional genes that correspond to new objectives added from one steering event to the next.

It should be noted that the method 400 may be modified in various ways in accordance with certain embodiments. For example, one or more operations of the method 400 may be eliminated or executed out of order in other embodiments. Additionally, other operations may be added to the method 400 in accordance with other embodiments.

Figure 5:
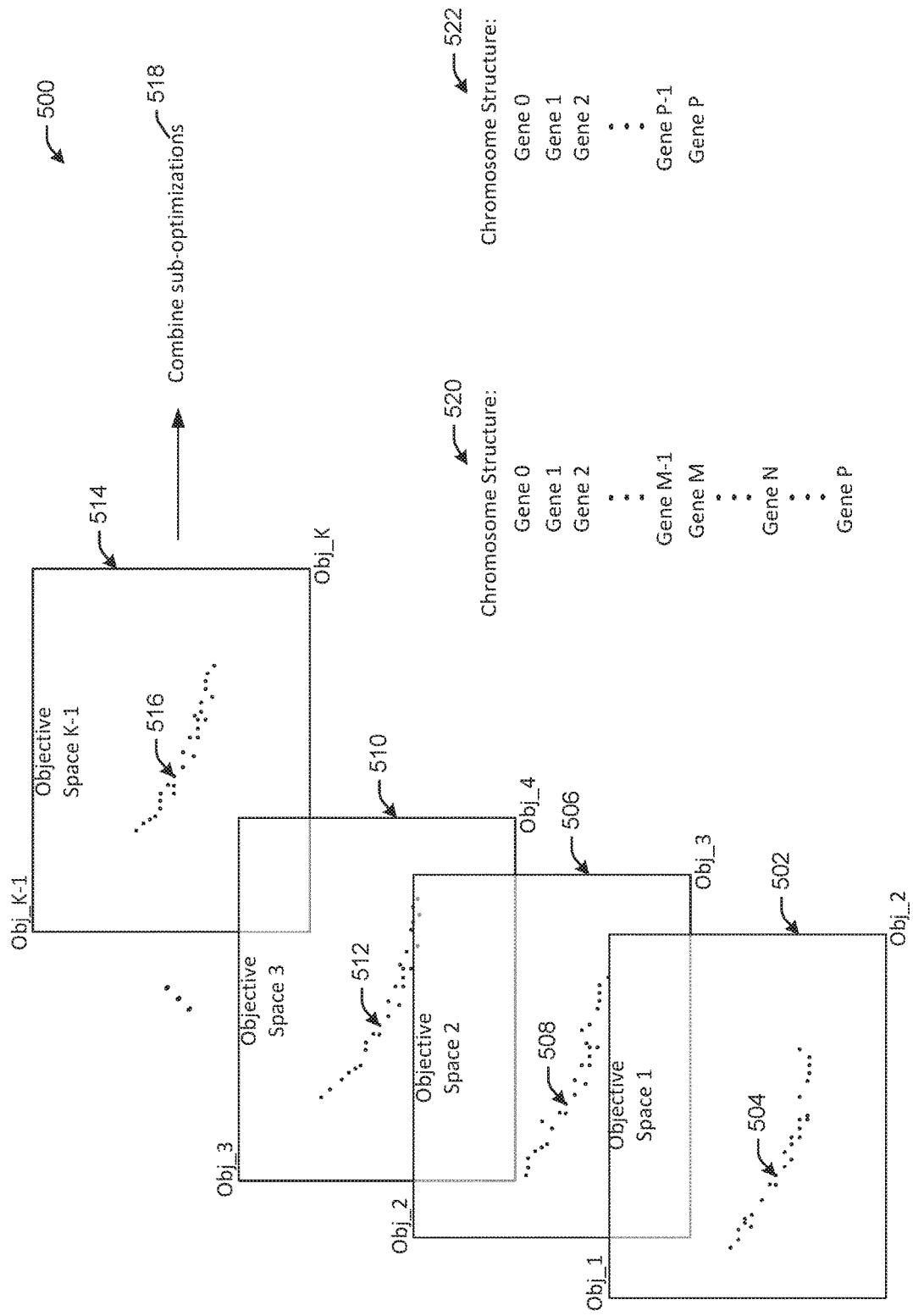
FIG. 5 is a schematic diagram illustrating a mechanism having series of sub-optimizations, where each of the sub-optimizations are performed with a different set of objectives prior to performing an optimization using all of the objectives of each of the sub-optimizations, in accordance with example embodiments of the disclosure.

FIG. 5 is a schematic diagram illustrating a mechanism 500 having a series of sub-optimizations 502, 506, 510, 514, where each of the sub-optimizations are performed with a different set of objectives prior to performing an optimization using all of the objectives of each of the sub-optimizations, in accordance with example embodiments of the disclosure. Unlike the previous example embodiments of FIGS. 2, 3, and 4, this present example embodiment is one where the objectives of the partial optimization are non-overlapping. In some cases the chromosomes may be static throughout all of the partial optimizations and the final optimization. In other cases, the chromosomes may change (e.g., the genes of the chromosome may change) for each set of objectives to which an optimization may be performed.

The first partial optimization, as shown in this non-limiting example, may be according to two objectives: Objective 1 and Objective 2. This first partial optimization may result in an optimized pareto-front 504. All or some of the chromosomes of the pareto-front 504 may be used as a starting point for a second partial optimization 506, in this case according to Objectives 3 and 4. This second partial optimization may produce a pareto-front 508, and chromosomes from this pareto front may be used as a starting point for a third partial optimization 510 that produces pareto-front 512. This type of mechanism may continue until a final partial optimization 514 producing a final pareto-front 516. At this point, a final optimization 518 may be performed in accordance with all of the objectives to which an optimization is desired. The final combination of sub-optimizations or partial optimizations may use the chromosomes of the final pareto-front 516 as a starting point for performing an optimization according to all of the objectives. In other cases, the final optimization 518 may draw chromosomes from one or more of the preceding partial optimization pareto-fronts 512, 508, 504. In some cases, this full set of objectives may be all of the objectives that were used in all of the partial optimizations. In other cases, one or more of the objectives used in the final optimization may not have been included in the set of preceding partial optimizations.

As discussed above, in some example embodiments, the chromosome structure 520 may evolve as the objectives to which an optimization is performed changes from one partial optimization to the next. Thus, for each succession of partial optimizations, additional genes may be added to the chromosome structure 520. In other example embodiments, the chromosome structure 522 may be of fixed size right from the starting partial optimization to the final optimization. In this case, for some of the partial optimizations, there may be genes that do not play a role in objective performance during that particular partial optimization and/or a preceding partial optimization.

According to example embodiments of the disclosure, a decision variable build-up may be performed in a series of linked optimizations without necessarily having any changes in the objectives involved in each of the series of optimizations. Thus, partial optimizations may be performed with a subset of all of the decision variables (e.g., genes of a chromosome structure) and the results of one partial optimization (e.g., chromosomes along a pareto-front) may be used as a starting point of a subsequent partial or full optimization. As a result, an optimization problem that may otherwise be intractable, may become solvable by using a decision-variable build-up mechanism, as disclosed herein. Thus, it will be appreciated that there may be three different build-up mechanisms that may be employed for the purposes of solving otherwise intractable optimization problems. A first mechanism may employ objective build-up and fixed decision variables over a series of optimizations, a second mechanism may employ decision variable build-up and fixed objectives over a series of optimizations, and a third mechanism may employ both decision variable and objective build-up over a series of optimizations.

As a non-limiting example of a decision variable build-up without objective build-up, consider an airline that wishes to optimize one or more objectives (e.g., maximize profit, minimize delays, minimize fuel consumption, etc.). In this case, the airline may represent each flight in its network (e.g., departure time, arrival time, etc.) as decision variables arranged as genes in a chromosome, as disclosed herein. The number of genes may be so great that the optimization problem may be intractable given the computing resources available to the airline. Therefore, the optimization may be performed in a series of linked optimizations, where the objectives remain constant throughout the series of linked optimizations, but the decision variables are incremented until all of the decision variables related to all of the flights are included in the final, full optimization. In this way, each partial optimization may use one or more of the pareto-optimized results of the previous partial optimization as a starting point and add additional genes corresponding to the subsequent partial or full optimization. In this way, a previously intractable optimization problem may become solvable based at least in part on a series of linked optimizations.

Figure 6:
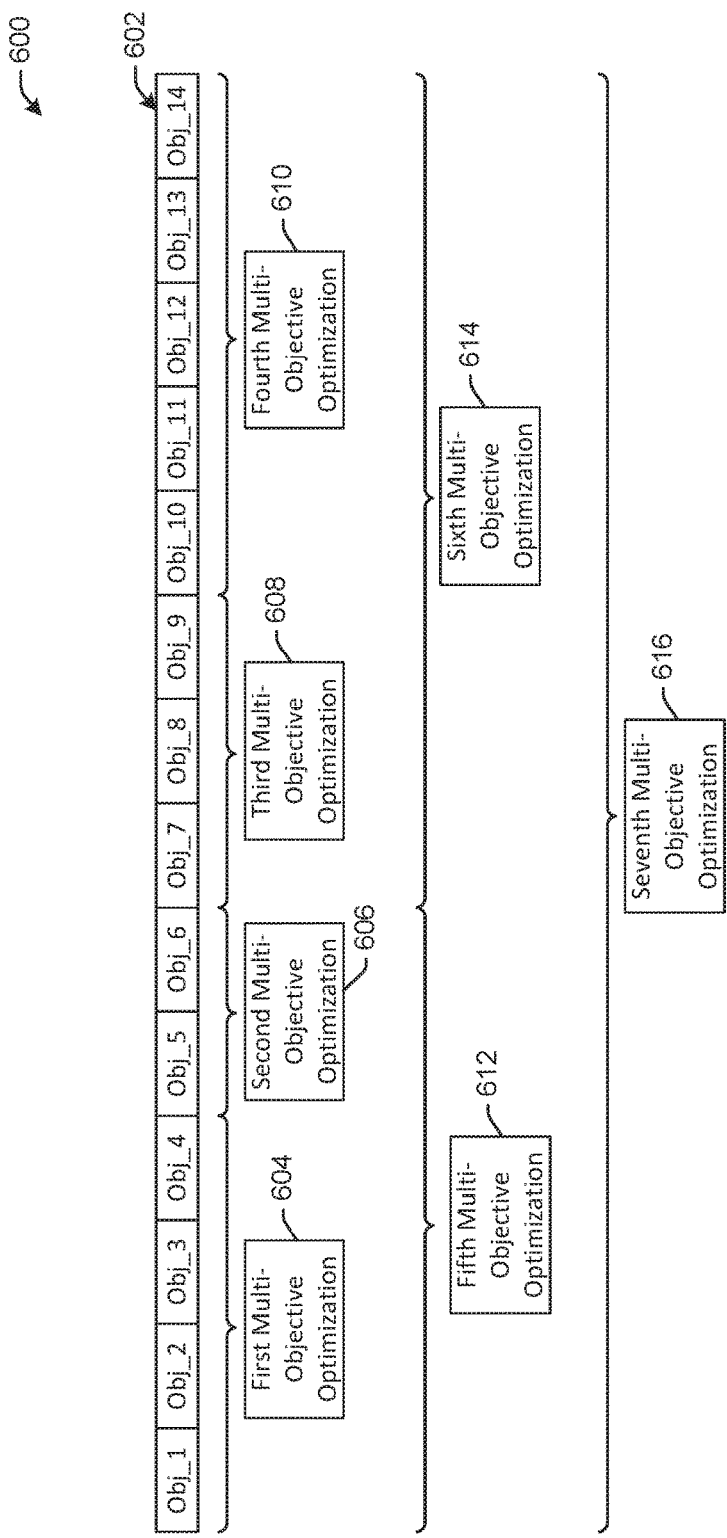
FIG. 6 is a schematic diagram that illustrates an example progression of performing sub-optimizations on a set of objectives prior to performing an optimization using all of the objectives, in accordance with example embodiments of the disclosure.

FIG. 6 is a schematic diagram that illustrates an example progression 600 of performing sub-optimizations 604, 606, 608, 610, 612, 614, 616 on a set of objectives prior to performing an optimization using all of the objectives, in accordance with example embodiments of the disclosure. In this particular progression 600 there may be 14 different objectives 602 over which to optimize as a non-limiting example. In this example embodiment, a first set of partial optimizations 604, 606, 608, 610 may be non-overlapping. In other words, none of the partial optimizations 604, 606, 608, 610 may include any objectives that may be in common. In some example embodiments, the subsequent partial optimization may use the pareto-optimized solution(s) of the preceding partial optimization as a starting point for its own optimization. In other example embodiments, the each of the first layer partial optimizations 604, 606, 608, 610 may run independently, insofar as the starting point may not be the results of the preceding partial optimization.

After the first layer of partial optimizations 604, 606, 608, 610 are completed, a second layer of partial optimizations 612, 614 may be performed. In example embodiments, the second layer of partial optimizations 612, 614 may use the results from the first layer partial optimizations 604, 606, 608, 610 (e.g., chromosomes on an optimized pareto-front) as a starting point for the performing the second level partial optimizations 612, 614. For example, the fifth multi-objective optimization 612 may optimize according to the same objectives as the first multi-objective optimization 604 and the second multi-objective optimization 606. In some cases, the fifth multi-objective optimization 612 may use the results from the first multi-objective optimization 604 and the second multi-objective optimization 606 as a starting point for its optimization. Similarly, the sixth multi-objective optimization 614 may optimize according to the same objectives as the third multi-objective optimization 608 and the fourth multi-objective optimization 610. In some cases, the sixth multi-objective optimization 614 may use the results from the third multi-objective optimization 608 and the fourth multi-objective optimization 610 as a starting point for its optimization.

After the second layer of partial optimizations 612, 614 are completed, a third and final layer with a full objective set optimization 616 may be performed. In this case, the full optimization may use results from the partial optimizations 612, 614, or indeed any preceding partial optimization 604, 606, 608, 610, 612, 614 as a starting point for performing the final and full optimization with all of the objectives 602. The results of the final optimization may be presented as the full optimization according to all of the objectives 602 to the stakeholder 210, and may optionally be implemented by the stakeholder 210.

It will be appreciated that in some cases, performing a full optimization with the full set of objectives 602 without the benefit of performing partial optimizations may result in an optimization problem that may be intractable, or otherwise relatively compute resource intensive. It will further be appreciated that although this example shows a tiered set of partial optimizations with three tiers, there may be any suitable number of tiers. For example, in some example embodiments, there may be three layers, four layers, or indeed any suitable number of layers of partial optimizations. Additionally, it will be appreciated that although in this non-limiting example there were no overlap of objectives in the first layer of partial optimizations 604, 606, 608, 610, in other example embodiments, there may be at least partial overlap between two or more of first layer partial optimizations 604, 606, 608, 610. Indeed, there may be overlap in the objectives 602 in any of the layers of partial optimization. It will further be appreciated that the objective set 602 of fourteen objectives is a non-limiting example. There may be any suitable number of objectives.

It will be appreciated that in some example embodiments, the series of optimizations may use a fixed-dimension chromosome structure, where all the genes associated with all of the objectives are present in the chromosome structure for all of the partial optimizations. In other example embodiments, it will be appreciated that the decision variables (e.g., genes of a chromosome structure) may change with steering events. In this case, each time, or some time, when new objectives are added to a partial or final full optimization, the chromosome structure may be expanded to add additional genes that correspond to new objectives added from one steering event to the next.

Figure 7:
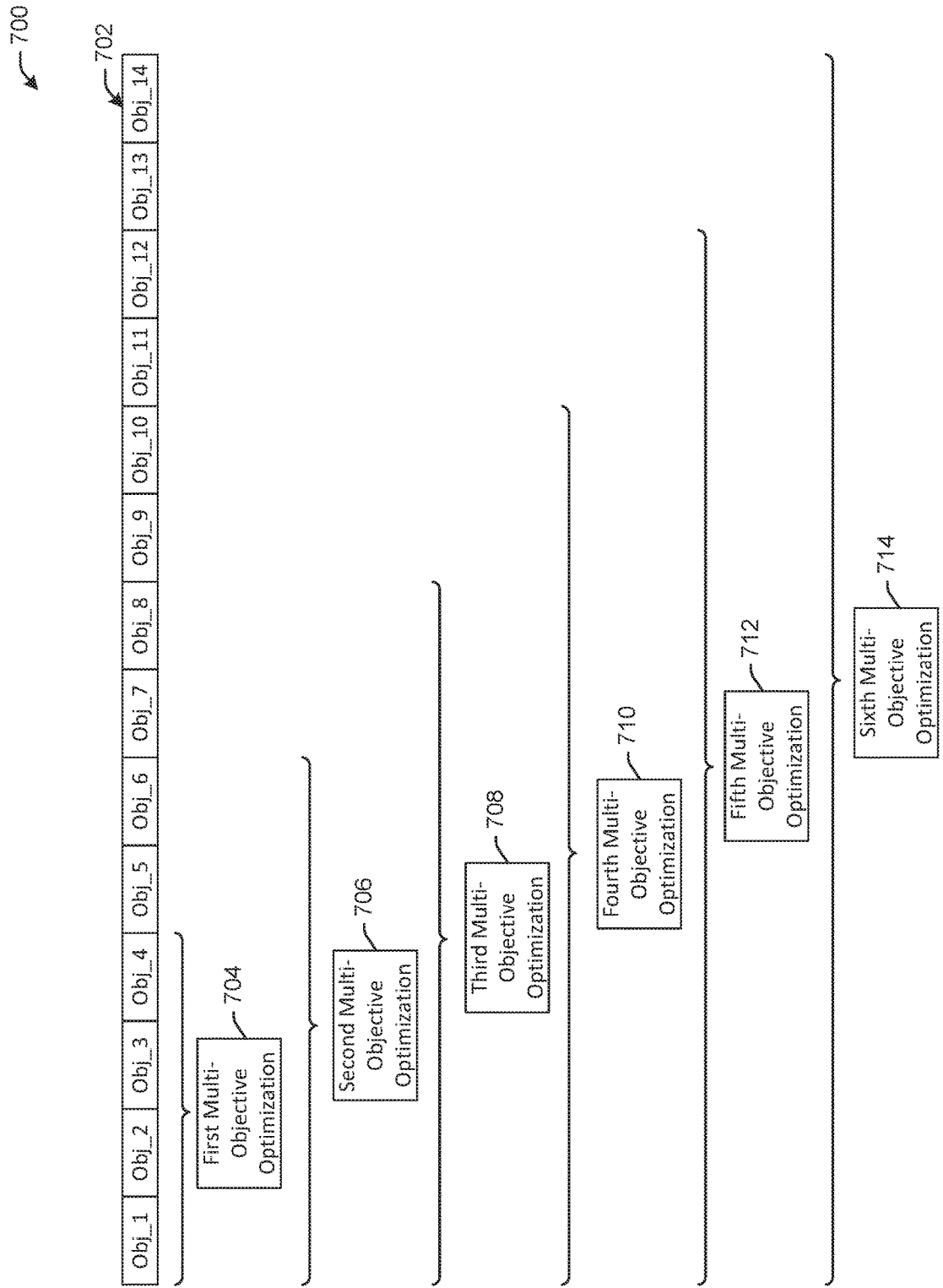
FIG. 7 is a schematic diagram that illustrates another example progression of performing sub-optimizations on a set of objectives prior to performing an optimization using all of the objectives, in accordance with example embodiments of the disclosure.

FIG. 7 is a schematic diagram that illustrates another example progression 700 of performing sub-optimizations 704, 706, 708, 710, 712, 714 on a set of objectives 702 prior to performing an optimization using all of the objectives 702, in accordance with example embodiments of the disclosure. In this example steering-based build-up of objectives in a series of partial optimizations, there is overlap in the objectives 702 from one partial optimization to the next. A first partial optimization 704 may include the first four objectives of the complete set of objectives 702. A second partial optimization 706 may include the first six objectives of the complete set of objectives 702. Furthermore, the second partial optimization 706 may use one or more of the pareto-optimized chromosomes from the first partial optimization 704 as a starting point for performing the second partial optimization 706. A third partial optimization 708 may include the first eight objectives of the complete set of objectives 702. Furthermore, the third partial optimization 708 may use one or more of the pareto-optimized chromosomes from the first partial optimization 704 and/or second partial optimization 706 as a starting point for performing the third partial optimization 708. A fourth partial optimization 710 may include the first ten objectives of the complete set of objectives 702. Furthermore, the fourth partial optimization 710 may use one or more of the pareto-optimized chromosomes from the first partial optimization 704, the second partial optimization 706, and/or the third partial optimization 708 as a starting point for performing the fourth partial optimization 710. A fifth partial optimization 712 may include the first twelve objectives of the complete set of objectives 702. Furthermore, the fifth partial optimization 712 may use one or more of the pareto-optimized chromosomes from the first partial optimization 704, the second partial optimization 706, the third partial optimization 708, and/or the fourth partial optimization 710 as a starting point for performing the fifth partial optimization 712.

After each of the partial optimizations 704, 706, 708, 710, 712 are completed, a final and full optimization 714 according to all of the objectives 702 may be performed. In this case, the full optimization may use results from the last partial optimization 712, or indeed any preceding partial optimization 704, 706, 708, 710 as a starting point for performing the final and full optimization with all of the objectives 702. The results of the final optimization may be presented as the full optimization according to all of the objectives 702 to the stakeholder 210, and may optionally be implemented by the stakeholder 210.

It will be appreciated that in some cases, performing a full optimization with the full set of objectives 702 without the benefit of performing partial optimizations may result in an optimization problem that may be intractable, or otherwise relatively compute resource intensive. It will further be appreciated that although this example shows five tiers of objective additive partial optimizations, there may be any suitable number of tiers. For example, in some example embodiments, there may be three layers, eight layers, or indeed any suitable number of layers of objective-additive partial optimizations. Additionally, not all tiers of partial optimizations may be fully inclusive (e.g., fully additive or fully overlapping) of all of the objectives of the preceding partial optimization. In other words, it will be appreciated that although in this non-limiting example there is overlap of the objectives used in a particular tier of partial optimization with the subsequent partial optimization, this overlap need not be for every tier of partial optimizations. It will further be appreciated that the objective set 702 of fourteen objectives is a non-limiting example. There may be any suitable number of objectives.

It will be appreciated that in some example embodiments, the series of optimizations may use a fixed-dimension chromosome structure, where all the genes associated with all of the objectives are present in the chromosome structure for all of the partial optimizations. In other example embodiments, it will be appreciated that the decision variables (e.g., genes of a chromosome structure) may change with steering events. In this case, each time, or some time, when new objectives are added to a partial or final full optimization, the chromosome structure may be expanded to add additional genes that correspond to new objectives added from one steering event to the next.

Figure 8:
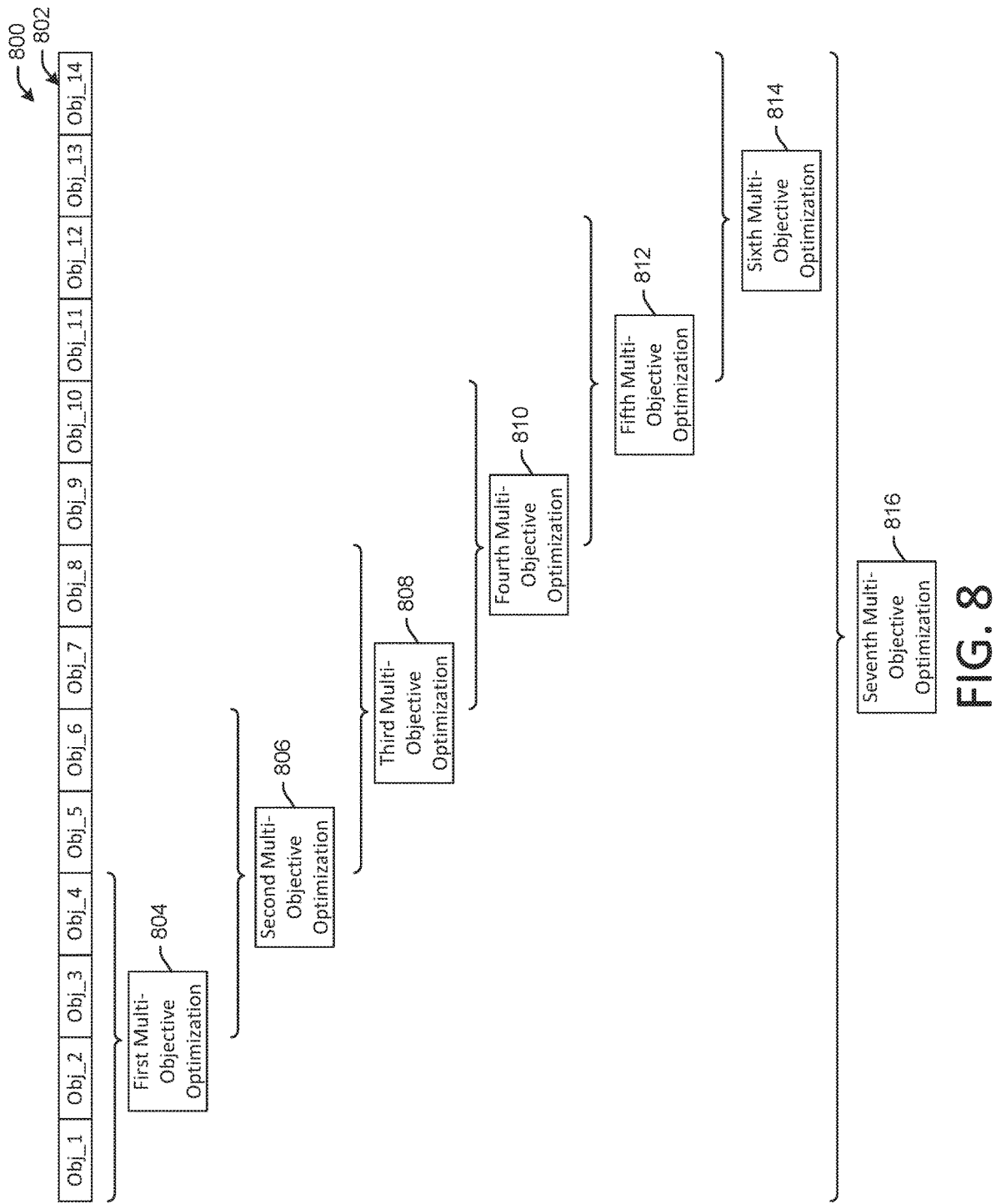
FIG. 8 is a schematic diagram that illustrates yet another example progression of performing sub-optimizations on a set of objectives prior to performing an optimization using all of the objectives, in accordance with example embodiments of the disclosure.

FIG. 8 is a schematic diagram that illustrates yet another example progression 800 of performing sub-optimizations 804, 806, 808, 810, 812, 814, 816 on a set of objectives 802 prior to performing an optimization using all of the objectives 802, in accordance with example embodiments of the disclosure. In this example steering-based build-up of objectives in a series of partial optimizations 804, 806, 808, 810, 812, 814, there is overlap in the objectives 802 from one partial optimization 804, 806, 808, 810, 812, to the next 806, 808, 810, 812, 814, but a subsequent partial optimization 806, 808, 810, 812, 814 may not include all of the objectives of the previous partial optimization. A first partial optimization 804 may include the first four objectives of the complete set of objectives 802. A second partial optimization 806 may include objectives three through six of the complete set of objectives 802. Furthermore, the second partial optimization 806 may use one or more of the pareto-optimized chromosomes from the first partial optimization 804 as a starting point for performing the second partial optimization 806. A third partial optimization 808 may include objectives five through eight of the complete set of objectives 802. Furthermore, the third partial optimization 808 may use one or more of the pareto-optimized chromosomes from the first partial optimization 804 and/or second partial optimization 806 as a starting point for performing the third partial optimization 808. A fourth partial optimization 810 may include objectives seven through ten. Furthermore, the fourth partial optimization 810 may use one or more of the pareto-optimized chromosomes from the first partial optimization 804, the second partial optimization 806, and/or the third partial optimization 808 as a starting point for performing the fourth partial optimization 810. A fifth partial optimization 812 may include objectives nine through twelve of the complete set of objectives 802. Furthermore, the fifth partial optimization 812 may use one or more of the pareto-optimized chromosomes from the first partial optimization 804, the second partial optimization 806, the third partial optimization 808, and/or the fourth partial optimization 810 as a starting point for performing the fifth partial optimization 812. A sixth partial optimization 814 may include objectives eleven through fourteen of the complete set of objectives 802. Furthermore, the fifth partial optimization 814 may use one or more of the pareto-optimized chromosomes from the first partial optimization 804, the second partial optimization 806, the third partial optimization 808, the fourth partial optimization 810, and/or the fifth partial optimization 812 as a starting point for performing the sixth partial optimization 814.

After each of the partial optimizations 804, 806, 808, 810, 812, 814 are completed, a final and full optimization 816 according to all of the objectives 802 may be performed. In this case, the full optimization may use results from the last partial optimization 814, or indeed any preceding partial optimization 804, 806, 808, 810, 812 as a starting point for performing the final and full optimization with all of the objectives 802. The results of the final optimization may be presented as the full optimization according to all of the objectives 802 to the stakeholder 210, and may optionally be implemented by the stakeholder 210.

It will be appreciated that in some cases, performing a full optimization with the full set of objectives 802 without the benefit of performing partial optimizations may result in an optimization problem that may be intractable, or otherwise relatively compute resource intensive. It will further be appreciated that although this example shows six tiers of objective additive partial optimizations, there may be any suitable number of tiers. For example, in some example embodiments, there may be four tiers, eleven tiers, or indeed any suitable number of layers of sliding objective partial optimizations. Additionally, not all tiers of partial optimizations may be fully sliding (e.g., overlapping with a preceding partial optimization and with a subsequent partial optimization) of all of the objectives. It will further be appreciated that the objective set 802 of fourteen objectives is a non-limiting example. There may be any suitable number of objectives. It will still further be appreciated that the sliding mechanism for the selection of objectives may occur in reverse order, or indeed in any suitable sequence, than what is shown here. For example, the same blocks of four objects with two objective overlap may start with objective 11 to objective 14, and finish with objective 1 to objective 4. In some example embodiments, the sequence pursued may be based at least in part on the information (e.g., convergence) from one or more earlier partial optimizations. It will be appreciated that in some example embodiments, the set of objectives to use in any particular partial optimization may be based at least in part on prior partial optimizations in the sequence. In other example embodiments, the sequence of objectives to use in a series of optimizations may be pre-defined, such as by the stakeholder 210.

It will be appreciated that in some example embodiments, the series of optimizations may use a fixed-dimension chromosome structure, where all the genes associated with all of the objectives are present in the chromosome structure for all of the partial optimizations. In other example embodiments, it will be appreciated that the decision variables (e.g., genes of a chromosome structure) may change with steering events. In this case, each time, or some time, when new objectives are added to a partial or final full optimization, the chromosome structure may be expanded to add additional genes that correspond to new objectives added from one steering event to the next.

Figure 9:
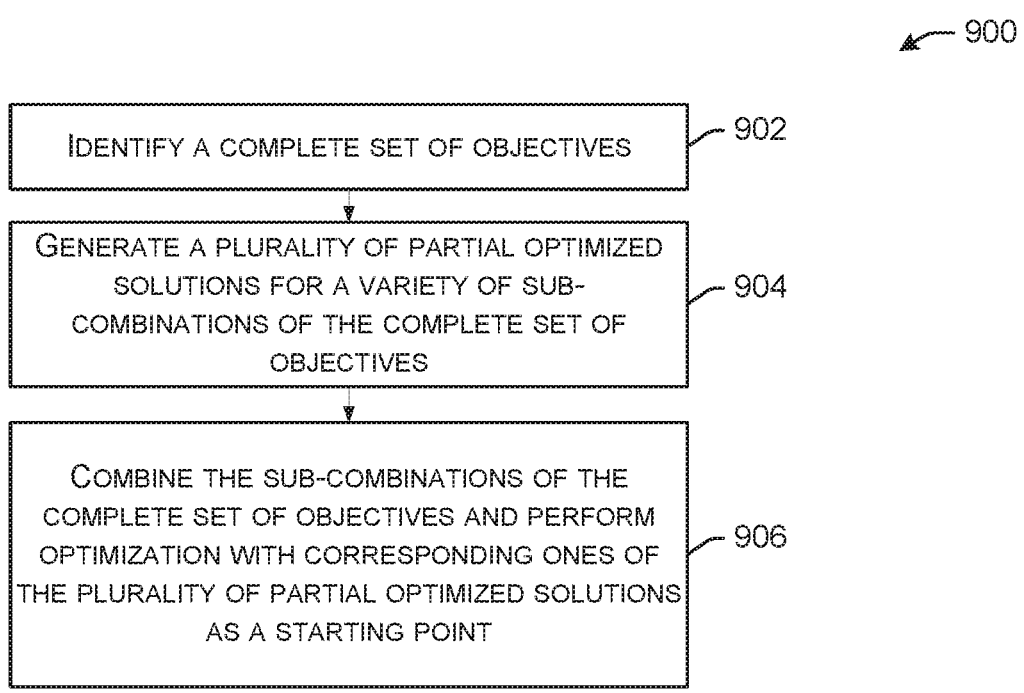
FIG. 9 is a flow diagram illustrates an example method for combining a number of sub-optimizations with a restricted set of objectives into a single optimization problem that optimizes for all of the objectives of the each of the sub-optimization problems, in accordance with example embodiments of the disclosure.

FIG. 9 is a flow diagram illustrates an example method 900 for combining a number of sub-optimizations with a restricted set of objectives into a single optimization problem that optimizes for all of the objectives of the each of the sub-optimization problems, in accordance with example embodiments of the disclosure.

At block 902, a complete set of objectives may be identified. As discussed above, these objectives may pertain to goals that a particular stakeholder 210 wishes to achieve by implementing an optimized solution according to all of the identified objectives. In some example embodiments, the number of objectives may be relatively large. For example, in some cases, the number of objectives may exceed 30 objectives. In some other cases, the number of objectives may exceed 70 objectives. In some further cases, the number of objectives may exceed 100 objectives. In example embodiments, the number of objectives may be such that attempting to perform a single MOEA optimization according to all of the objectives may result in an intractable optimization problem and/or a relatively high impairment of computing resources. In some example embodiments, the objectives of the optimization problem may be specified in the input parameters 110 to the optimization system 100.

At block 904, a plurality of partial optimized solutions for a variety of sub-combinations of the complete set of objectives may be generated. Each of the optimized solutions may be based on an overlapping, partially overlapping, or non-overlapping set of objectives. Thus the different partial optimized solutions may each have a different combination of objectives selected from the complete set of objectives. In some example embodiments, the correspondence of the subset of objectives to each respective partial optimization may be specified in the input parameters 110 to the optimization system 100.

At block 906, the sub-combinations of the complete set of objectives and perform a combined optimization with corresponding ones of the plurality of partial optimized solutions as a starting point. Thus the last optimization performed may include all of the objectives, as initially identified in the process of block 902. By having the benefit of partially optimized solutions of the partial optimizations as a starting point, the final full optimization may be more easily performed. In some cases, this may mean that an otherwise intractable optimization problem may be solvable by performing method 900. In other cases, fewer computing resources may be expended to arrive at an optimized solution to the multi-objective problem.

It will be appreciated that in some example embodiments, the series of optimizations may use a fixed-dimension chromosome structure, where all the genes associated with all of the objectives are present in the chromosome structure for all of the partial optimizations. In other example embodiments, it will be appreciated that the decision variables (e.g., genes of a chromosome structure) may change with steering events. In this case, each time, or some time, when new objectives are added to a partial or final full optimization, the chromosome structure may be expanded to add additional genes that correspond to new objectives added from one steering event to the next.

It should be noted that the method 900 may be modified in various ways in accordance with certain embodiments. For example, one or more operations of the method 900 may be eliminated or executed out of order in other embodiments. Additionally, other operations may be added to the method 900 in accordance with other embodiments.

Figure 10:
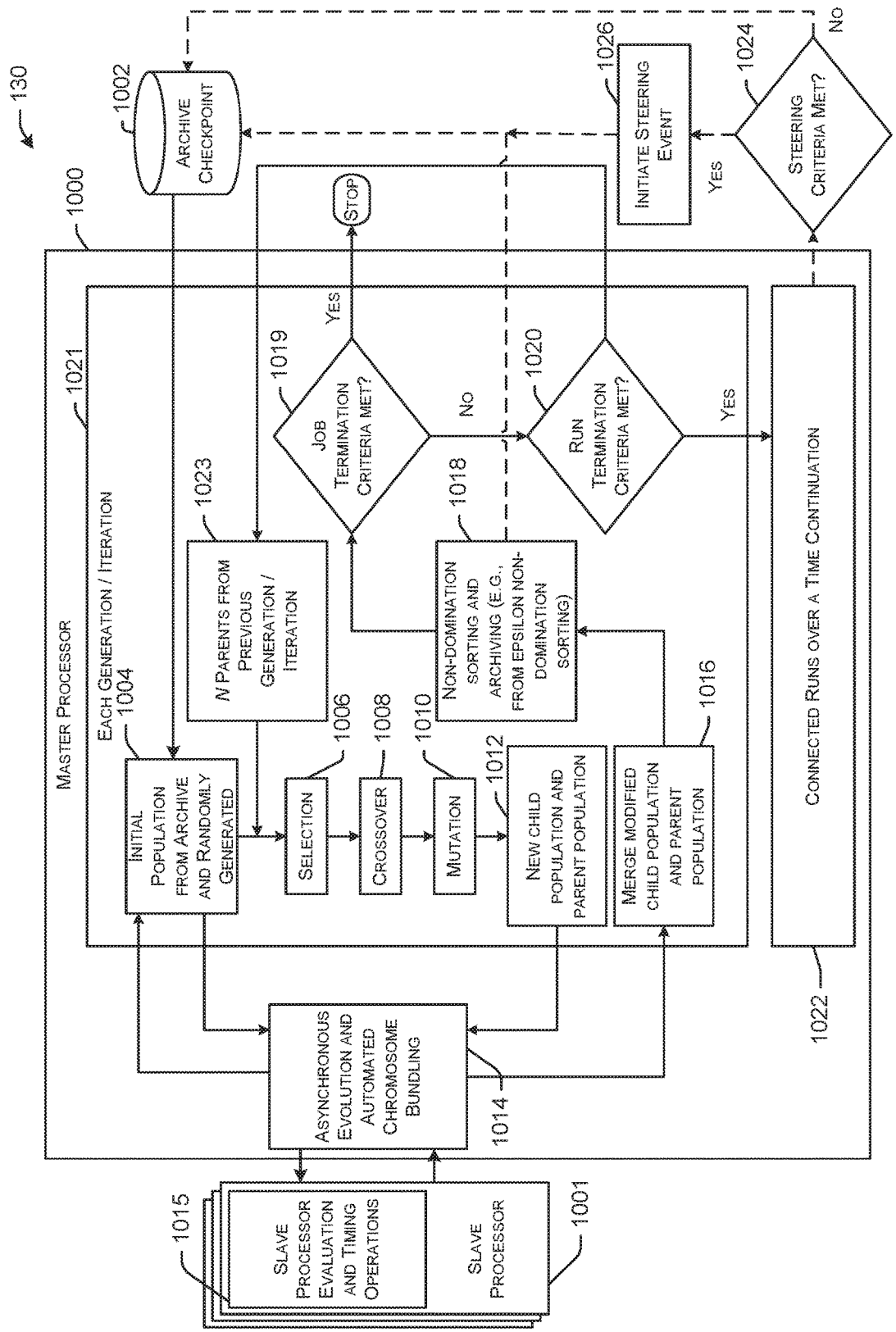
FIG. 10 is a block diagram that illustrates an example MOEA system with objective refinement of FIG. 1, in accordance with example embodiments of the disclosure.

FIG. 10 is a block diagram that illustrates an example MOEA system 130 with objective refinement 150 of FIG. 1, in accordance with example embodiments of the disclosure. In some example embodiments, the MOEA system 130 may be an evolutionary algorithm system, such as those described in at least U.S. Pat. Nos. 8,255,344 and 8,285,653, both of which are incorporated herein, in their entirety by reference.

The evolutionary algorithm system may employ techniques of biologic natural selection to efficiently search a multi-objective optimization space that may not be amenable to search by analytic, iterative, or other methods. In example embodiments, the search variables or decision variable, such as the prices of various items in a pricing problem, may be organized as a data structure that resembles genes in a chromosome or data elements in a data array. In example embodiments, the decision variables of the optimization problem (e.g., pricing problem) may be organized as an allocation of variables that are to be optimized according to the multiple objectives of the optimization problem. In other words, the solution may be represented as a data structure having the various decision variables. In some example embodiments, the solutions may be organized as chromosomes with genes (e.g., individual decision variables) at the MOEA system 130.

Upon organizing the search variables, the evolutionary algorithm may proceed to generate child chromosomes, from parent chromosomes. Therefore, in example embodiments, the "children" to evaluate in any given generation may be based, at least in part on the "parents" or a subset thereof, from the previous generation. The evolutionary algorithm may be configured to evaluate the chromosomes (e.g., prices of items, schedule of train departures, etc.) from any given generation, based at least in part on the corresponding respective performance on the multiple objectives that are being used to evaluate the optimization problem (e.g., pricing optimization, schedule optimization, etc.). The evolutionary algorithm system 130, may further be configured to select those chromosomes (e.g., solutions) that display the best performance according to the multiple objectives, in any given generation and use those chromosomes to generate children by crossover. Crossover may introduce diversity, while preserving as-yet known advantageous genes, into the population of solutions to be evaluated and considered within the search space to arrive at an optimal solution. The evolutionary algorithm system may further be configured to introduce mutations (i.e. random or pseudo-random changes in one or more genes of a child chromosome) to introduce further diversity of potential solutions within the search space for the purposes selecting a relatively optimized solution set (e.g., flight times in an airline network) in accordance with the identified objectives of the optimization. When new child solutions are generated using the biological-styled processes described above, a check for feasibility may be performed. If a potential solution is not feasible, then in some example embodiments, a drive to feasibility may be performed, such as by a constraint minimization engine. In other example embodiments, potential solutions that are found to be not feasible may be eliminated from the population of solutions that are to be evaluated from a multi-objective standpoint. In yet other example embodiments, solutions that are found to be not feasible may be retained in the population to be evaluated on a multi-objective performance basis. In some of these cases, the non-feasible solutions may be retained for a limited period of time (e.g., one generation, predetermined number of generations, etc.). In the same or other cases, the non-feasible solutions may be tagged as such, so that the genetic material of the non-feasible solutions may be used to drive to more optimized solutions, without allowing the non-feasible solutions to be presented as an optimized solution.

It can be seen that the mechanisms used by the evolutionary algorithm (e.g., genetic operators, selection, crossover, mutation, etc.), particularly in the form of a multi-objective evolutionary algorithm system 130, are not mechanisms that are limited to arrive at a convergence in an iterative fashion. Indeed, the mechanism is one that employs intelligent "hopping around" and evaluating according to optimization objectives and/or constraint limitations, rather than just a convergence mechanism. It will be appreciated that such as framework may be amenable to solving multi-objective, multi-dimensional, and/or highly constrained problems, where relative pockets of "good performance" and/or optimized performance according to the optimization objectives may not always be contiguous. In these types of problems, analytical methods (e.g. Lagrange multipliers, etc.), iterative convergence methods (e.g. Newton's method, etc.), and/or methods that rely on relatively high degree of a priori knowledge of trade-offs in the search space may not be as effective at arriving at an optimized solution as the multi-objective evolutionary algorithm system 130, as described herein. Although the multi-objective evolutionary algorithm system 130 is discussed herein, it will be appreciated that any suitable system for implementing a heuristic optimization, such as, but not limited to Monte Carlo methods, extremal optimization (EO) methods, etc. may be implemented in accordance with example embodiments of the disclosure.

As disclosed here, the MOEA system 130, in conjunction with the objective refinement system 150 may be configured to perform a series of optimizations, such as partial optimizations according to a subset of objectives to which optimization is to be achieved. The objective refinement system 150 may be configured to identify and/or drive a steering event. For the purposes of this disclosure, a steering event is where criteria for objective refinement is met, objectives are modified for a subsequent partial or full optimization by the MOEA 130, and as needed, the decision variable (e.g., the genes of the chromosomes) are modified to accommodate the optimization objectives of a subsequent optimization.

In this example embodiment, the MOEA system 130 may be implemented as an example parallel processing system that executes an evolutionary algorithm, according to an example embodiment of the disclosure. As shown in FIG. 10, a first portion of the evolutionary algorithm may be performed by a master processor 1000 while a second portion of the evolutionary algorithm may be performed by one or more slave processors 1001, as discussed herein. In some example embodiments, the constraint and/or objective evaluation may be implemented on the slave processor(s) 1001, while the objective optimization engine may be implemented on the master processor 1000.

In an example embodiment of the disclosure, an executed job of the evolutionary algorithm may comprise a plurality of connected runs 1022 that occur in a sequence to form a time continuation. Each run 1022 may comprise one or more evolutionary operations performed during one or more generations/iterations 1021. It will be appreciated that a run may be connected to a prior run in that at least some of the same parents are shared in the "initial population" of launch parameters utilized for initiating respective runs, according to an example embodiment of the disclosure.

Example processing by an executed job of the evolutionary algorithm will now be discussed in further detail. Referring now to block 1004, the master processor 1000 may receive or obtain an initial population of parent chromosome data structure (e.g., an initial set of prices that may be allocated to one or more hotel room types (items)). In other words, the initial population may represent a starting point, such as a best guess or a set of parameters that may represent the current implementation prior to the Z benefits of the optimization(s), as described herein. In an example embodiment of the disclosure, each parent chromosome data structure (e.g., departure times in a scheduling problem, prices for items in a pricing problem, etc.) may include the chromosome, where the chromosome may include one or more parameters (which may also be referred to as "genes"), which may include:

Static (Fixed Value/Constant) Variables: Once assigned, the values of the static variables remain constant and are not changed by any evolutionary operations of an evolutionary algorithm;

Evolved Variables: The values of the evolved variables may be changed by one or more evolutionary operations of an evolutionary algorithm; and Derived Variables: The values of the derived variables are derived based upon a combination of one or more static variables, evolved variables, and other derived variables in accordance with one or more functions.

Math Variable: A variable may be derived based upon an equation using operands comprising either constants or variables that specify values from other elements specified. The variable names may follow the name convention <alphabetic character><number>, where the <alphabetic character> may specify the column position of elements within an array and/or spreadsheet, and the <number> may specify the row position within the array and/or spreadsheet. It will be appreciated that a math variable may be a fixed or constant value (double precision or integer precision).

Function Variable: A variable may be produced by a function call, which may include calling arguments of a plurality of other constants, and variables.

Any one of the static variables, evolved variables, the derived variables, the math variables, and/or the function variables may be of a variety of types including, but not limited, to integer, double precision, characters, Boolean (two possible values, e.g. 'ON' or 'OFF'; '0' or '1'; 'TRUE' or 'FALSE'), pair of double precision numbers pair of integers array of double precision numbers, array of integers file/spreadsheet, and/or Gaussian.

Still referring to block 1004, the initial population of parent chromosome data structures may be obtained by one or more sources. In an example embodiment of the disclosure, the initial population of parent chromosome data structures may be obtained from a combination of the archive checkpoint 1002 and random generation of new chromosome data structures. The archive checkpoint 1002 may include a known solution, such as an experiential solution. The archive checkpoint 1002 may further contain residual seeds that may be a population of elite solutions that are to be retained in the population due to relatively good genetic performance. As a non-limiting example, 25% of the initial population of parent chromosome data structures may be obtained from the archive checkpoint 1002 while 75% of the initial population may be randomly generated. The chromosomes obtained from the archive checkpoint 1002 may have previously been evaluated in accordance with the objective functions. On the other hand, the randomly generated chromosomes may not have been evaluated in accordance with the objective functions, and thus, they may be delivered to block 1014, which allocates the chromosomes to the slave processors 1001 for objective function evaluation by block 1015. In certain embodiments, the initial population of parent chromosomes may include one or more known solutions, or a baseline solution, provided to the heuristic optimizer system 100 in the form of an evolutionary algorithm system 130.

The archive checkpoint 1002 may include an elite set of chromosome data structures (i.e., elite solutions of scheduled departure times) obtained from one or more prior generations/iterations 1021, according to an example embodiment of the disclosure. Initially, the archive checkpoint 1002, in certain embodiments, may be populated with one or more known solution chromosomes, such as a baseline chromosome solution. Alternatively, if no baseline solution is known, the archive checkpoint may initially be populated with a derived known solution using a variety of suitable mechanisms, such as vastly infeasible search space mechanism. The archive checkpoint 1002 may take the form of a data file or database stored in a computer memory, computer disk, network storage, or other non-volatile memory. In accordance with embodiments of the disclosure, the archive checkpoint 1002 may contain one or more elite set of chromosomes, such as known solutions.

Archived chromosome data structures that were previously evaluated in a prior generation/iteration 1021 may be associated with a plurality of objective function values corresponding to a respective plurality of objective functions. Each objective function may be associated with any predefined objective to be optimized by the executed job of the evolutionary algorithm. For example, in a pricing problem, an objective function may be associated with achieving a high profit level, and a corresponding objective function value may indicate which chromosome data structure (based upon the included chromosome and its respective genes) is able to achieve the greatest profit. It will be appreciated that in many cases, there may be multiple objectives. It will further be appreciated that in some cases, one or more of the objectives may not be independent of each other. Indeed, the objective functions may have non-zero correlation to each other. It will yet further be appreciated that the objective functions may be of any suitable variable type, such as integer, double precision, characters, Boolean, or the like.

Alternatively, in block 1004, the initial population of parent chromosome data structures may be produced from only randomly generated chromosomes. In generating the random chromosome data structures, the values for the evolved and/or static variables (e.g., fixed values/constants) in the one or more chromosomes may be selected to be within specified allowable ranges or limits. Values for the derived variables can be calculated from one or more evolved variables, static variables, and/or other derived variables in accordance with one or more specified functions. The randomly generated parent chromosome data structures may then be delivered to block 1014, which allocates the chromosomes to the slave processors 1001 for objective function evaluation and/or constraint function evaluation by block 1015. Once the objective function evaluations evaluation in block 1015 have been completed, and the objective function values have been received in block 1014, then each of the randomly generated parent chromosome data structures may be associated with a respective plurality of objective function values.

Having received or obtained the initial population of parent chromosome data structures in block 1004, processing may then proceed to block 1006. In block 1006, the master processor 1000 may select pairs of parent chromosome data structures from the input population of parent chromosome data structures of launch parameters. In an example embodiment of the disclosure, the selection of the pairs of parent chromosome launch parameter data structures may occur according to a tournament selection process, which may include a crowded tournament selection process. An example tournament selection process in accordance with an example embodiment of the disclosure may occur by first selecting two pairs with equal probability based upon a uniform distribution of the input population. Then each pair of chromosome data structures competes in a tournament where the individual with the best fitness is retained. It will be appreciated that best fitness may be determined according to domination rank (as described herein) and where the domination rank is the same, the greatest crowding distance (e.g., nearest neighbor with respect to the entire population in accordance with a measure of diversity) wins the tournament. Other measures of diversity may be used without departing from example embodiments of the disclosure. The winners of each tournament become the two parents resulting from the selection process of block 1006. It will be appreciated that a predetermined number of pairs of parent chromosome data structures may be selected in block 1006. It will also be appreciated that a particular parent chromosome data structure may be present in two or more selected pairs of parent chromosome data structures, according to an example embodiment of the disclosure. In some cases, the number of parent chromosomes selected in each round or iteration may be dynamic.

Following block 1006, the chromosomes in selected pairs of parent chromosome data structures may be subject to one or more evolutionary operators to generate a plurality of child chromosome data structures, according to an example embodiment of the disclosure. Two example evolutionary operators are illustrated by blocks 1008 and 1010. For example, block 1008 illustrates a crossover evolutionary operator in which a portion of the parameter values or "gene" values (i.e. individual launch parameters of a satellite of the satellite constellation under design) may be exchanged between chromosomes in selected pairs of parent chromosome data structures to generate new pairs of chromosome data structures. In an example embodiment of the disclosure, the crossover evolutionary operation may be capable of performing crossover using integer or non-integer numbers (e.g., double precision numbers, etc.), binary representation of numbers, letters, and/or symbols. As another example, block 1010 illustrates a mutation evolutionary operator in which a parameter value or gene value (e.g., an evolved variable value) in a chromosome of a chromosome data structure may be varied or otherwise changed to another value by a mutation.

It will be appreciated that the crossover evolutionary operator and the mutation evolutionary operator need not necessarily be applied to genes of each received chromosome in the chromosome data structure. In an example embodiment of the disclosure, only a portion or percentage of the received chromosomes in the chromosome data structures in blocks 1008 and 1010 may have their genes crossed-over or mutated, respectively. The respective portions or percentages that are crossed-over and/or mutated may be predetermined or dynamically varied during operation of the evolutionary algorithm, according to an example embodiment of the disclosure. For example, a first predetermined portion or percentage (e.g., 50%-80%) of the received chromosomes of the chromosome data structures may have genes that are crossed over in block 1008 while a second predetermined portion or percentage (e.g., 1%-3%) of the received chromosomes of the chromosome data structures may have genes that are mutated in block 1010. On the other hand, for dynamic variations, the respective portions or percentages that are crossed-over and/or mutated may be increased or decreased during runtime to increase or decrease the rate of evolutionary progress as desired or required. It will be appreciated that other evolutionary operators besides blocks 1008 and 1010 may be available without departing from example embodiments of the disclosure. Likewise blocks 1008 and 1010 may be performed in a different order than that shown in FIG. 10 or otherwise combined into a single block without departing from example embodiments of the disclosure.

After the evolutionary operations of block 1006, 1008, and 1010, a new population of child chromosome data structures (i.e. launch parameters to be evaluated) may be obtained in block 1012. Following block 1012, processing may proceed to block 1014. In block 1014, the new population of child chromosome data structures may be received into a "To Evaluate" list or queue. Block 1014 may then allocate the chromosome data structures from the "To Evaluate" list or queue to the plurality of slave processors 1001 according to an asynchronous evolution process. An automated chromosome bundling process may also be utilized in block 1014 to determine how many chromosome data structures should be included in a respective chromosome bundle for a respective slave processor 1001. For example, a slave processor 1001 with faster processing capability may receive a chromosome bundle with a larger number of chromosome data structures. Alternatively, the slave processor 1001 may receive a fixed number of launch parameters sets in the form of chromosome data structures in a chromosome bundle, but simply receive a larger number of chromosome bundles within a predetermined amount of time. The example automated chromosome bundling process may allow efficient allocation of chromosome data structures among the plurality of slave processors 1001. In some cases, the number of flags, indicating the number of genes that are permitted to be considered as deviating from the baseline solution chromosome, may be considered in the bundling process.

In block 1015, each slave processor 1001 may have received a chromosome bundle comprising one or more chromosome data structures from the master processor 1000. Additionally, in certain embodiments, the slave processors 1001 may further receive a baseline chromosome or solution organized in any manner, representing a known solution. The slave processors 1001 may be homogenous or heterogeneous in processing capability. Each slave processor 1001 may evaluate, in accordance with a plurality of objective functions, the received chromosome bundle of chromosome data structures, and/or the baseline solution chromosome to generate a plurality of respective objective function values for each chromosome data structure in block 1015. In some example embodiments, the slave processors 1001 may further perform the functions of constraint minimization. The slave processors 1001, therefore, in example embodiments, receive a solution to be both constraint minimization driving, in addition to objective value determination. In addition, each slave processor 1001 may also perform timing operations or calculations, including determination of certain wait times and/or evaluation times associated with the respective slave processor 1001, in block 1015. As each slave processor 1001 finishes the objective function evaluations and/or timing operations in block 1015, the slave processor 1001 may provide a results bundle (e.g., objective function values) and timing data (e.g., wait times and/or objective function evaluation times) to the master processor 1000. The slave processor 1001 may further receive, in example embodiments, a constraint violated solution and return a constraint non-violated solution to the master processor 1000. As a result, the constraint minimization engine may be implemented on the slave processors 1001 in accordance with example embodiments. In some of these example embodiments, the slave processors 1001 may further provide objective values, as determined using the objective models 120, as shown in FIG. 1, along with the non-constraint solutions. The master processor 1000 may provide the received objective function values as well as an identification of the corresponding evaluated child chromosome data structures to a "Finished" list or queue. It will be appreciated that with asynchronous evolution processing, the objective function results may be included in the "Finished" list or queue on an as-received basis from the slave processor 1001. Indeed, the evolutionary process may be asynchronous in that as soon as the "To Evaluate" list is empty for a given generation/iteration 1021, the processing taking place in block 1014 is completed, where the child population passed to block 1016 is comprised of all of the chromosome data structures currently within the "Finished" list. It will be further appreciated that the results from some of the chromosome bundles previously sent to the various slave processors 1001 may not have been received at the time the "To Evaluate" list is emptied. These may be referred to as late chromosome data structures from one or more prior generations/iterations.

In block 1016, the master processor 1000 may receive a modified child population of chromosome data structures from the asynchronous evolution process of block 1014. In certain embodiments, the modified child population may include different chromosome structures as well as a different number of chromosome data structures as compared to the child population of block 1012. The received modified child population is merged with the current parent population, as illustrated by block 1016. In block 1018, the master processor 1000 may perform non-domination sorting (e.g., based off of an epsilon vector) of the merged list of child and parent chromosome data structures of launch parameter sets under evaluation to identify an elite set of chromosome data structures based at least in part on the corresponding objective function values. According to an example embodiment, non-domination sorting may utilize the concept of domination to compare solutions provided by the merged list of child and parent chromosome data structures. A solution $x_1$ is said to dominate solution $x_2$ if both conditions 1 and 2 identified below are true:

Condition 1: The solution $x_1$ is no worse than $x_2$ in all objectives.

Condition 2: The solution $x_1$ is strictly better than $x_2$ in at least one objective.

If both conditions 1 and 2 are satisfied, then all of the following statements are substantially equivalent:

$x_2$ is dominated by $x_1$, $x_1$ is non-dominated by $x_2$, or $x_1$ is non-inferior to $x_2$.

Accordingly, non-domination sorting in block 1018 may be performed to determine a set of chromosome data structures (e.g., designs) that are non-dominated with respect to other solutions when comparing the respective objective function values corresponding to the objective functions. For example, non-domination sorting may involve classifying the merged list of child and parent chromosome data structures into multiple fronts (for two objective functions), surfaces (for three objective functions), volume (for 4 objective functions), or hypervolumes (for 5+ objective functions) based off of their respective domination rank. In an example embodiment of the disclosure, domination ranking may proceed by first considering the entire merged list of child and parent chromosome data structures. The objective function values corresponding to the objective functions for each chromosome data structure are compared and the non-dominated solutions from the list are identified. These solutions are assigned a domination rank of 1 and removed from the merged list. The reduced merged list of child and parent chromosome data structures are then considered and the next set of non-dominated solutions are identified and assigned a rank of 2. This process is iterated until all members of the merged list are assigned a domination rank. In addition, an evolutionary operator providing crowded tournament selection may be applied to increase the diversity of choice among the solutions making up the fronts, surfaces, volumes, or hypervolumes. As an example, during crowded tournament selection, a solution may win a tournament if it has the highest non-domination rank, or if the ranks are equal, the solution with the better crowding distance may prevail. Crowding distance may be defined as the largest distance or cuboid surrounding a solution in which no other solutions are present. The obtained elite set of chromosome data structures for the particular generation/iteration may be stored in the archive checkpoint 1002 or another archive of a computer memory or other data storage for subsequent retrieval.

Following processing in block 1018, processing may proceed to block 1019. In block 1019, a determination is made as to whether the current job is completed such that the evolutionary algorithm should be terminated. A job typically comprises processing involving a plurality of connected runs 1022, where each run 1022 may include processing associated with one or more generations/iterations 1021. Block 1019 may include, but is not limited to, termination based upon whether the search has failed to produce sufficient improvement in solutions over a predefined number of generations/iterations or whether a maximum number of function evaluations have been completed or a maximum time (e.g., based upon a wall clock time) has elapsed. For example, the evolutionary algorithm may terminate, according to sufficient improvement termination criterion, if a predetermined percentage (e.g., 90%) of the obtained solutions remain in the same epsilon rectangles, volumes, or hypervolumes/hyperrectangles for a prior number of generations (e.g., the last 20 generations), or alternatively, across a prior number of connected runs, in accordance with an example box fitness termination criteria. In other words, the optimization may terminate if the improvements on a predetermined number of iterations of the objective optimization with non-constraint solutions have not improved substantially. In an example embodiment of the disclosure, a box fitness termination criteria may have two components. First, looking back over a predetermined number of previous generations/iterations, the total quantity of unique epsilon box addresses must remain unchanged above a predefined threshold (e.g., 90% or another user-defined percentage). Second, the greater-than-or-equal-to threshold must be maintained for a predefined number of generations/iterations. If both of these components are met, then the job may be terminated. It will be appreciated that the first component discussed above may not be sufficient as the sole termination criteria because the box-fitness percentage change may oscillate above and below the predefined threshold (e.g., 90% or another user-defined percentage). If this occurs, then a counter utilized for the second component may be reset such that the evolutionary algorithm continues with additional generations/iterations until the box-fitness percentage change has held above the predefined threshold for the predefined number of sequential generations. It will be appreciated that the obtained solutions comprising the chromosome data structures may be output in a variety of formats, including a database format, a comma separated value (CSV) format, or a graphical format.

If block 1019 determines that the job is not complete, then processing may proceed to block 1020 to determine whether the current run 1022 has completed. In determining whether the current run is complete, block 1020 may determine whether a current run 1022 has failed to produce improvement in quantity and quality of the solutions generated from the prior iterations/generations 1021. The quantity measure may be based upon the number of solutions. The quality measure may be based on some quantification of distance from a utopia point, box fitness, or yet another measure.

If block 1020 determines that a current run 1022 is not complete, then processing may proceed to block 1023, wherein a population of parent chromosome structures may be obtained or otherwise selected from the elite chromosome data structures determined from block 1018. The prior process may then be repeated for another generation/iteration 1021 using the parent chromosome data structures from the prior generation/iteration. It will be appreciated that because the evolution process of block 1014 is asynchronous, there may be one or more late child chromosome data structures received in the "Finished" list or queue in 1016 that are associated with one or more pairs of parent chromosome data structures allocated to slave processors 1001 during one or more prior generations/iterations. Therefore, in the next generation/iteration 1021, the merged children chromosome data structures in block 1016 may likewise include those late child chromosome data structures as well as current child chromosome data structures from parent chromosome data structures allocated to slave processors 1001 during the current generation/iteration 1021.

On the other hand, block 1020 may determine that a current run 1022 is complete. For example, looking back over a predetermined number of generations, the search may have failed to produce improvement in the solutions during each generation/iteration 1021 of the current run 1022. Improvement may be based upon the quantity of the solutions (e.g., the number of solutions) and the quality of the solutions (e.g., some quantification of distance from a utopia point, box fitness, etc.). In this case, the current run 1022 may be completed, and processing proceeds to initiate a subsequent run 1022. The subsequent run 1022 may generate an initial population by invigorating the elite solutions stored in the archive checkpoint 1002. In particular, the subsequent run 1022 may utilize a first number of the elite solutions from the archive checkpoint 1002 as part of the initial population utilized in block 1004, but may also invigorate the initial population by adding a second number of randomly generated parent chromosome data structures. In example embodiments, the elite solutions may be non-constraint solutions. In example embodiments, the elite solutions may be non-constrained. The randomly generated parent chromosome data structures may be generated and evaluated using the example processes discussed with respect to blocks 1004 and 1014.

If at block 1020, it is determined that run termination criteria is met, then at block 1024, it may be determined if a steering event is to be implemented. In other words, it may be determined if an additional generation using the same set of objectives are to be run to attempt to converge to a pareto-optimized front, or if the objectives are to be refined and if a new optimization (partial or full) is to be performed using a new set of objectives. In some cases, the new set of objectives may be a partial set of the complete objectives to which an optimization is sought. In this case, a subsequent partial optimization may be implemented according to the next set of objectives to which to optimize. In other cases, the new objectives after a steering event may be the full set of objectives to which to optimize the optimization problem. If it is determined that a steering event is to be implemented, then at block 1026, a steering event may be implemented. This may include providing the new objective functions and/or constraint functions corresponding to the subsequent partial or full optimization to the slave processors 1001. In some example embodiments, the steering event may be initiated internal to the optimization system 100, from processors external to the optimization system (e.g., a stand-alone objective refinement system 150), or from a human or decision body in the loop (e.g., the stakeholder 210).

In some example embodiments, the processors 1000, 1001 of the MOEA system 130 may be implemented as appropriate in hardware, software, firmware, or combinations thereof. Software or firmware implementations of the processors 1000, 1001 may include computer-executable or machine-executable instructions written in any suitable programming language to perform the various functions described. Hardware implementations of the processors 1000, 1001 may be configured to execute computer-executable or machine-executable instructions to perform the various functions described. The one or more processors 1000, 1010 may include, without limitation, a central processing unit (CPU), a digital signal processor (DSP), a reduced instruction set computer (RISC), a complex instruction set computer (CISC), a microprocessor, a microcontroller, a graphical processor unit (GPU), a field programmable gate array (FPGA), or any combination thereof. The optimization system 100 may also include a chipset (not shown) for controlling communication between the one or more processors 1000, 1001 and one or more of the other components of the optimization system 100. The one or more processors 1000, 1001 may also include one or more application specific integrated circuits (ASICs) or application specific standard products (ASSPs) for handling specific data processing functions or tasks. In example embodiments, the MOEA system 130 may further include input/output (I/O) device(s) such as display screen(s), touch sensitive display screen(s), speaker(s), haptic device(s), or the like, may be controlled via one or more I/O device interfaces.

The MOEA system 130 may still further include memory for storing applications and/or instructions that may be executed by the processors 300, 301 to perform functions described herein. The memory may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

It will be appreciated that the solutions as determined by the MOEA system 130 may be optimized for multiple objectives, while being viable (in accordance with all constraints of the optimization problem). Many-objective optimization not only allows one to independently quantify the various coverage criteria but also allows one to do this in a way that minimizes simplifying assumptions. The goal of multiple-objective optimization, in contrast to the single-objective optimization case where the global optimum is desired (except in certain multimodal cases), is to maximize or minimize multiple measures of performance simultaneously whereas maintaining a diverse set of Pareto-optimal solutions. The concept of pareto optimality refers to the set of solutions in the feasible objective space that is non-dominated. A solution is considered to be non-dominated if it is no worse than another solution in all objectives and strictly better than that solution in at least one objective. Consider a situation where both f1 and f2 objectives are to be minimized, but where the two objectives are in conflict, at least to some extent, with each other. Because both objectives are important, there cannot be a single solution that optimizes the f1 and f2 objectives; rather, a set of optimal solutions exists which depict a tradeoff.

Figure 11A:
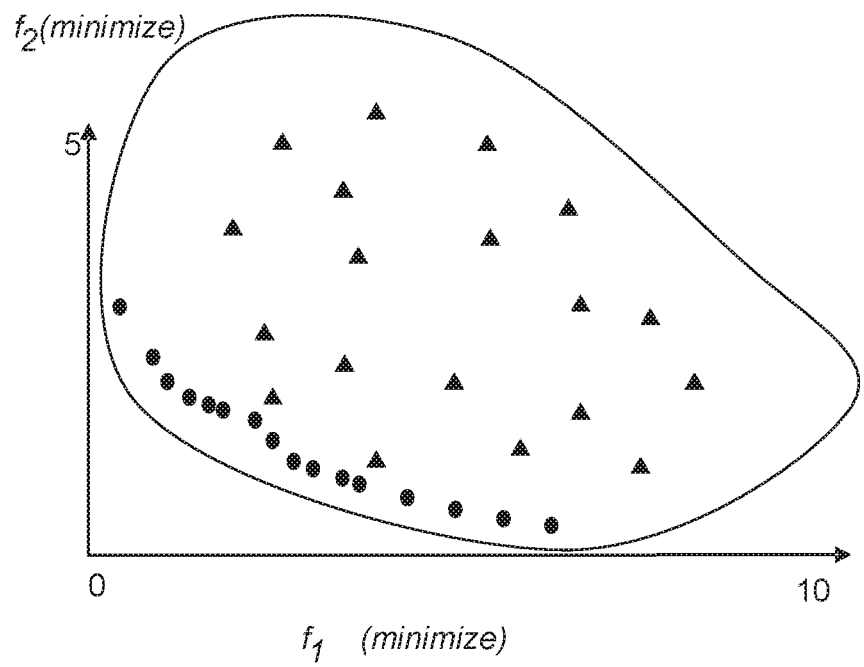
FIGS. 11A and 11B are charts illustrating an example praetor-optimized solution to a multi-objective problem, in accordance with example embodiments of the disclosure.
Figure 11B:
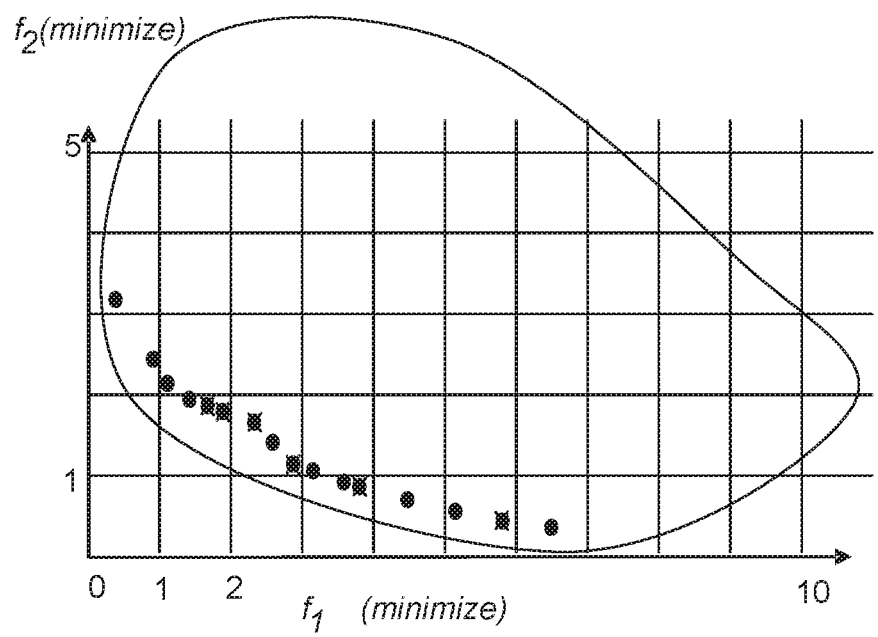

FIGS. 11A and 11B are charts illustrating an example pareto-optimized solution to a multi-objective problem, in accordance with embodiments of the disclosure. Initially, a first non-domination sorting may be applied to the current population to remove solutions that are dominated by at least one other solution in the objective space. It will be appreciated that a solution is non-dominated by another solution because it is strictly better in at least one objective function (determined by comparing the objective function values) and no worse than the eliminated solution with respect to the remaining objective functions (determined by comparing the objective function values).

Following the first non-domination sorting, epsilon non-domination sorting may be applied to the remaining solutions in the current population. Epsilon non-domination sorting may include plotting or mapping the remaining solutions to a first epsilon value for objective function $f_1$ and a second epsilon value for objective function $f_2$, according to an example embodiment of the invention. The first epsilon value may be associated with a first epsilon spacing or step size $\epsilon_1$ associated with objective function $f_1$, and a second epsilon value may be associated with second epsilon spacing or step size $\epsilon_2$ associated with objective function $f_2$. Each solution may then be associated with an epsilon vector or epsilon box address ($\epsilon_1$, $\epsilon_2$) corresponding to the first epsilon value and the second epsilon value. If two or more solutions have the same epsilon box address, then the epsilon non-domination sorting may retain a single solution per epsilon box address ($\epsilon_1$, $\epsilon_2$). This solution may be determined based upon whether objective functions $f_1$ and $f_2$ are being minimized or maximized, according to an example embodiment of the invention. It will be appreciated that while only two objective functions are described herein, other example embodiments may utilize more than two objective functions without departing from example embodiments of the invention. For example the f1 and f2 values may correspond to cost and impairment in item pricing problems.

In an example embodiment of the invention, a box fitness termination criteria may have two components. First, looking back over a predetermined number of previous generations/iterations, the total quantity of unique epsilon box addresses must remain unchanged above a predefined threshold (e.g., 90% or another user-defined percentage). Second, the greater-than-or-equal-to threshold must be maintained for a predefined number of generations/iterations. If both of these components are met, then the job may be terminated. It will be appreciated that the first component discussed above may not be sufficient as the sole termination criteria because the box-fitness percentage change may oscillate above and below the predefined threshold (e.g., 90% or another user-defined percentage). If this occurs, then a counter utilized for the second component may be reset such that the evolutionary algorithm continues with additional generations/iterations until the box-fitness percentage change has held above the predefined threshold for the predefined number of sequential generations.

FIG. 11A illustrates a feasible design region associated with a first objective function $f_1$ and a second objective function $f_2$. Within the feasible design region is a snapshot of a population of solutions of a given generation/iteration, according to an example embodiment of the invention. Based upon the goal of minimizing the first and second objective functions $f_1$ and $f_2$, non-domination sorting identifies all of the circles as being non-dominated solutions and all of the triangles as dominated solutions. The dominated solutions may be eliminated from the population or removed from further consideration, according to an example embodiment of the invention. It will be appreciated that the goals of minimizing the f1 and f2 are merely an example. In other examples, such as in a pricing problems, the goal may be to maximize f1 and f2, particularly if f1 is revenue and f2 is profit. In yet other optimization problems, the goal may be to maximize f1 and minimize f2, or vice-versa.

In FIG. 11B, epsilon non-domination sorting may be applied to the remaining solutions (e.g., non-eliminated solutions) from the first non-domination sorting of FIG. 4A. An epsilon spacing or step size can be defined for objective functions $f_1$ and $f_2$ to generate an epsilon grid in the objective space, where following epsilon non-domination sorting, only one solution exists in each block/box of the grid defined by an epsilon box address. In FIG. 11B, the epsilon non-dominated solutions are illustrated by circles, while the epsilon dominated (inferior) solutions are illustrated by the crossed-out circles. Because both of objective functions $f_1$ and $f_2$ are being minimized in this example, the solution closest to the lower left corner of each block/box (as measured by distance) is kept as the epsilon non-dominated solution. It will be appreciated that in alternate embodiments, that one or both of objective functions $f_1$ and $f_2$ could also be maximized as well without departing from example embodiments of the invention.

Figure 12:
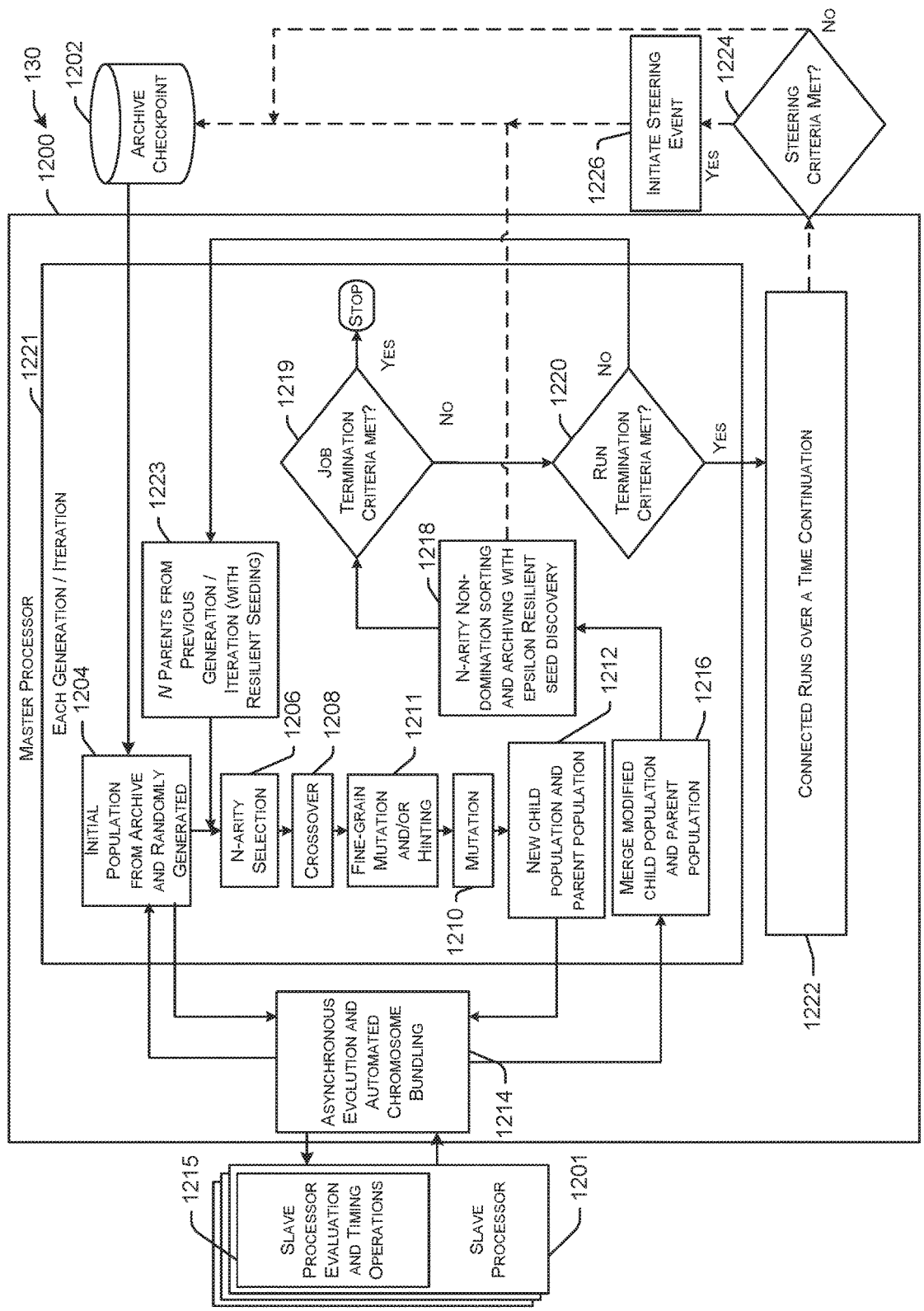
FIG. 12 is a block diagram that illustrates an example MOEA system with objective refinement and archive explosion mitigation of FIG. 1, in accordance with example embodiments of the disclosure.

FIG. 12 is a block diagram that illustrates an example MOEA system 130 with objective refinement and archive explosion mitigation of FIG. 1, in accordance with example embodiments of the disclosure. The descriptions of elements 1200, 1201, 1202, 1204, 1208, 1210, 1212, 1214, 1215, 1216, 1219, 1220, 1222, 1224, and 1226 may be substantially similar to the descriptions of elements 1000, 1001, 1002, 1004, 1008, 1010, 1012, 1014, 1015, 1016, 1019, 1020, 1022, 1024, and 1026 of FIG. 10, and in the interest of brevity, will not be repeated here.

According to example embodiments, the selection process 1206 may be an n-arity selection, where the selection of parent chromosomes for forming a child population may be based at least in part on the quality of non-domination associated with the chromosomes in the selection processes. In other words, when selecting (e.g., tournament selection) between two different chromosomes, the number of objectives according to which a particular chromosome is non-dominated may be assessed in the selection process. For example a 3-arity (e.g., non-dominated according to three objectives) non-dominated chromosome may be selected over a 2-arity chromosome. In this way, when two chromosomes are in a tournament selection, the chromosome that has a greater arity (e.g., is non-dominated according to a greater number of objectives) may be selected. When the arity is the same of the two chromosomes from which to select, then other factors may be used to select between the two chromosomes. For example, an Euclidean distance of each of the chromosomes to a utopia corner may be used to identify the chromosome to be selected. In other examples, a random process (e.g., coin toss) may be used to select between two different chromosomes with the same arity. It will be appreciated that by identifying the arity of the chromosome, in example embodiments, a smaller number of elite chromosomes may be retained in the archive 1202 rather than every non-dominated chromosome. Thus, archive explosion may be prevented by using n-arity sorting 1218 and n-arity-based selection 1206. N-arity based selection is described further in conjunction with FIG. 15.

The non-domination sorting 1218 process associated with n-arity based-sorting may involve comparing a particular chromosome based on a plurality and/or all of the objectives to which an optimization (e.g., partial or full) may have been performed. In such as process, the chromosome being sorted may be compared to every other chromosome of the population and based on each of the objectives of that optimization. The number of objectives for which the chromosome dominates all other chromosomes may be determined as the arity of its non-domination. In some example embodiments, n-arity-based sorting may be performed only for feasible chromosomes (e.g., chromosomes that do not violate any constraints). In other cases, infeasible chromosomes may also be sorted relative to other infeasible chromosomes according to all of the objective that were optimized to. In example embodiments, only a predetermined number of non-dominated chromosomes, such as the chromosomes with the highest arity non-domination may be propagated and or archived.

At block 1211, fine-grain mutations and/or hinting may be used. Fine-grain mutations may limit the amount of mutation and/or allow smaller steps of mutations (e.g., finer precision mutation) that may be performed on some or all of the chromosomes to generate child populations. For example, small, fine-grain mutations may allow small steps in a particular gene, such as, for example 10 or more decimal places. The fine-grain mutation techniques may be particularly applicable to applications where objective values and/or constraint values may be relatively sensitive to small changes in the gene. The fine-grain mutation may thus substantially retain the qualities of good genetic material, such as elite chromosomes and/or resilient seed chromosomes. Gene hinting may be used to influence particularly important genes of child chromosomes generated by the evolutionary operators. In example embodiments, certain resilient genes may be identified and those genes may participate in cross-over operations for the purpose of generating the child chromosomes from the parent chromosomes. Resilient genes may hint at corresponding child gene values. In example embodiments, genes of a child chromosomes may be based at least in part on the corresponding genes of the parent chromosomes, as well as the values of the corresponding hinting genes of one or more resilient chromosomes. As a non-limiting example, a gene of a child chromosome may be based on a 30% linear influence of each of its parents, 25% influence of a first hinting gene, and a 15% influence of a second hinting gene.

In example embodiments, at block 1223 the parents from previous generations may be provided for evolutionary operations 1206, 1208, 1211, 1210. These chromosomes may include resilient seeds that may be used for any variety of the evolutionary operations 1206, 1208, 1211, 1210. The resilient seeds may be discovered at the processes of block 1218, where the non-domination sorting of chromosomes may be performed. In example embodiments, as the number of objectives increase, in order to maintain a manageable number of non-dominated intermediate solutions, the size of the epsilon cell of epsilon non-domination ranking may be expanded. By doing so, there may be fewer non-dominated chromosomes selected along a pareto-front, since in epsilon non-domination sorting there is only one (or alternatively a predetermined number of) chromosomes selected from each epsilon space (e.g., hyper-dimensional space) and with a larger epsilon size, there would be fewer non-dominated epsilon spaces. However, to make sure that good genetic material is not being lost by expanding the size of the epsilon spaces, in example embodiments, provisions may be made to allow more than one non-dominated chromosome selection from some of the epsilon spaces, and these selections may be provided as resilient seeds. In some example embodiments, these extra selections may exhibit good performance in one or a particular number of objectives. In the same or other example embodiments, the selected chromosomes may exhibit good (e.g., best) performance according to one or a subset of most important objectives. In yet the same or other example embodiments, the selected chromosomes may be in a dominated epsilon space, but exhibit a superior performance according to at least one objective compared to a chromosome in a non-dominated epsilon space. In yet further example embodiments, the selected chromosomes may be in a dominated epsilon space, but exhibit a shorter path to a utopia corner of a non-dominated epsilon space. The concepts of selecting resilient seeds are further discussed in conjunction with FIG. 16.

Additionally, in example embodiments, the non-domination sorting at block 1218 may involve n-arity based non-domination sorting. In other words, it may be determined for each chromosome being sorted, according to how many objectives is the chromosome non-dominated. Thus, it may be determined and recorded as to how many objectives a particular chromosome may exhibit superior performance. For example, if a particular chromosome is non-dominated in four different objectives, then that chromosome may be 4-arity non-dominated. The chromosomes, after being sorted according to arity, may be stored, in example embodiments, with an indicator of that chromosome's arity. In some example embodiments, the chromosomes may be selected, such as by the processes of block 1206, according to the arity of the chromosome. For example, a chromosome with a higher arity may win a tournament selection process at block 1206. With n-arity non-domination sorting, fewer non-dominated chromosomes may be archived at the archive 1202, because, in example embodiments, a predetermined number of chromosomes may be archived with preference given to chromosomes with a relatively high arity. N-arity-based non-domination sorting is further described in conjunction with FIG. 14.

Figure 13:
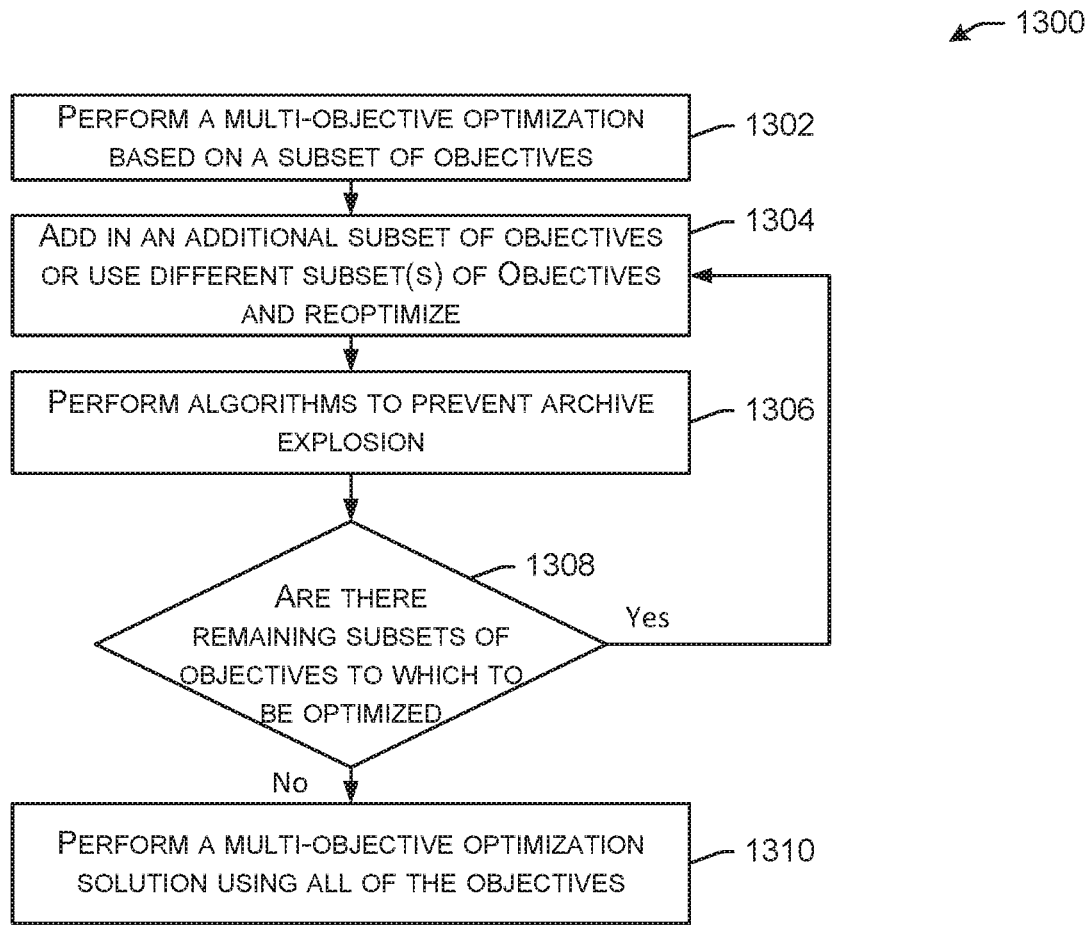
FIG. 13 is a flow diagram that illustrates an example method for performing a multi-objective optimization with algorithms to prevent archive explosion, in accordance with example embodiments of the disclosure.

FIG. 13 is a flow diagram that illustrates an example method 1300 for performing a multi-objective optimization with algorithms to prevent archive explosion, in accordance with example embodiments of the disclosure. The method 1300 may be performed by a combination of the MOEA system 130 and the objective refinement system 150. The method 1300 includes algorithms to prevent archive explosion by a variety of archive management mechanisms. Although the archive management mechanisms may be independently used, such as in single stage multi-objective heuristic optimizations, the archive management mechanisms may be particularly useful in conjunction with multi-stage, steering-based, objective refinement mechanisms, as disclosed herein.

At block 1302, a multi-objective optimization may be performed based on a subset of objectives. At block 1304, an additional subset of objectives may be added or different subset(s) of objectives may be used to reoptimize. In some cases, pareto-optimized solutions from the first partial optimization of block 1302 may be used as a starting point for this partial optimization. At block 1306, algorithms to prevent archive explosion may be implemented. These algorithms may include residual chromosomes combined with expanded epsilon spaces, gene hinting, residual seeds, n-arity non-domination sorting, fine grain mutations, combinations thereof, or the like.

At block 1308, it may be determined if there are remaining subsets of objectives to which to optimize. If it is determined that there are additional objectives to which to optimize, then the method 1300 may return to block 1304 to add an additional subset of objectives or use different subset(s) of objectives to reoptimize. In this way, processes of blocks 1304, 1306, and 1308 may be repeated until partial optimizations have been performed using each of the subsets (e.g., alone or in combination) of objectives. If at block 1308 it is determined that there are no other subsets of objectives that are to be used for a partial optimization, then the method 1300 may proceed to block 1310, where a multi-objective optimization may be performed using all of the objectives. In example embodiments, the pareto-optimized solution from this final optimization may be presented to the stakeholder 210 as potential optimized solutions to be implemented to best achieve the objectives desired by the stakeholder 210. In example embodiments, the final optimization with the full set of objectives may start with a population of solutions form the last partial optimization. By doing so, the final optimization, with potentially a relatively large number of objectives, may be more tractable. In other example embodiments, the chromosomes from the pareto-fronts of the preceding partial optimizations may be used as a starting point for the final, full optimization.

It will be appreciated that in some example embodiments, the series of optimizations may use a fixed-dimension chromosome structure, where all the genes associated with all of the objectives are present in the chromosome structure for all of the partial optimizations. In other example embodiments, it will be appreciated that the decision variables (e.g., genes of a chromosome structure) may change with steering events. In this case, each time, or some time, when new objectives are added to a partial or final full optimization, the chromosome structure may be expanded to add additional genes that correspond to new objectives added from one steering event to the next.

It should be noted that the method 1300 may be modified in various ways in accordance with certain embodiments. For example, one or more operations of the method 1300 may be eliminated or executed out of order in other embodiments. Additionally, other operations may be added to the method 1300 in accordance with other embodiments.

Figure 14:
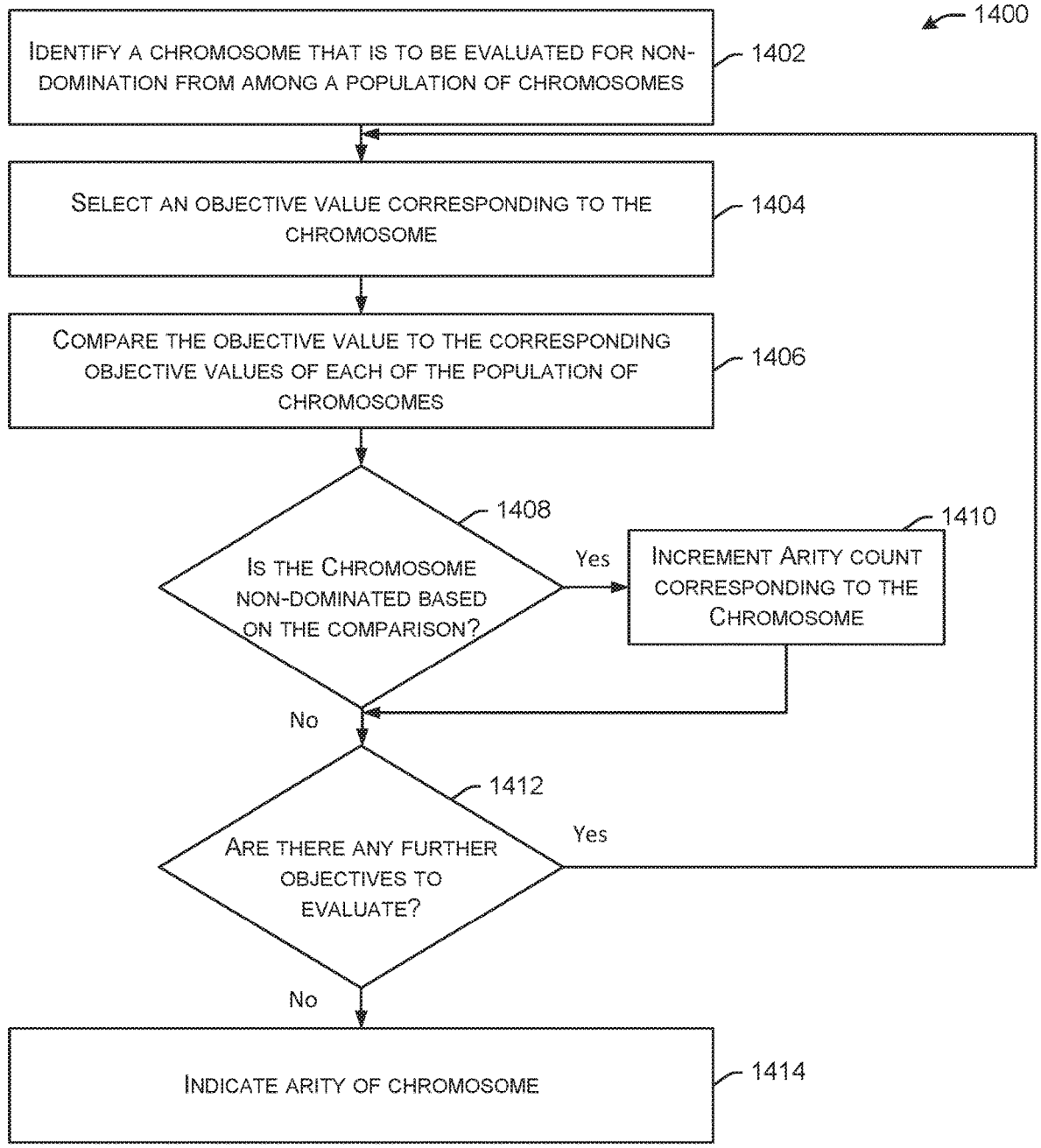
FIG. 14 is a flow diagram that illustrates an example method for determining an arity count of a non-domination of a chromosome that is to be used in n-arity selection, in accordance with example embodiments of the disclosure.

FIG. 14 is a flow diagram that illustrates an example method 1400 for determining an arity count of a non-domination of a chromosome that is to be used in n-arity selection, in accordance with example embodiments of the disclosure. N-arity non-domination sorting and archiving may be performed with or without progressive objective addition mechanisms for relatively large number of objective optimization. In example embodiments, method 1400 may be an implementation of the processes of non-domination sorting of block 1218 of FIG. 12.

At block 1402, a chromosome that is to be evaluated for non-domination from among a population of chromosomes is identified. This chromosome may be the chromosome that is to be non-domination sorted relative to all of the other chromosomes to be sorted. In example embodiments, the chromosome identified for sorting may be feasible. In other words, according to these example embodiments, the chromosomes being sorted may already be verified as not violating any constraints and representing solutions that can be implemented, such as by a stakeholder 210.

At block 1404, an objective value corresponding to the chromosome may be selected. The objective value may be a value derived for any one of the objectives that are used as a criterion for determining the quality of the solution represented by the chromosome being sorted. The objective value may be determined, such as by the evaluation and timing operations 1215 of the slave processors 1201 of FIG. 12, using the objective models provided as models 120 to the optimization system 100.

At block 1406, the objective value may be compared to the corresponding objective values of the each of the population of chromosomes. From this comparison it is possible to determine if the chromosome being compared is indeed non-dominated by all of the other chromosomes in the population. For example, if a particular objective is being used for the evaluation and the goal is maximize this particular objective, and if the chromosome being evaluated has a value for this particular objective that is greater than the value for that particular objective for all of the other chromosomes, then the chromosome being evaluated may be deemed non-dominated for that objective.

At block 1408, it may be determined if the chromosome is non-dominated based on the comparison. If it is determined that the chromosome is non-dominated, then the method 1400 may proceed to block 1410, where an arity count corresponding to the chromosome may be incremented. The method 1400, after block 1410, may proceed to block 1412. At block 1408, if it was determined that the chromosome is not non-dominated based on the comparison, then the method 1400 may proceed to block 1412, where it may be determined if there are any further objectives to evaluate.

If at block 1412 it is determined that there are additional objectives to evaluate, then the method 1400 may return to block 1404 to select another objective value with which to compare the chromosome. If, however, at block 1412, it is determined that there are no other objectives with which to evaluate the chromosome, then the method 1400 may proceed to block 1414, where the arity count of the chromosome may be indicated. In some example embodiments, the chromosome may be stored in an archive 1202 or in memory with an indication of its non-domination arity (n-arity). Generally, chromosomes with a higher arity may be more elite solutions and may generally be relatively more resilient in the solution population, such as from generation to generation and/or across steering events. In some cases, the chromosome may be labeled with the arity of its non-domination, such as by indicating the same in metadata associated with and/or included in the chromosome. In some example embodiments, the arity of the chromosome may be used to store the chromosome in different tiers or partitions of the archive 1202. For example, chromosomes may be stored with other chromosomes of like arity. For example, all 5-arity chromosomes may be stored in a different tier of the archive than all 3-arity chromosomes.

It can be seen that by ranking, archiving, retaining (e.g., persisting), and/or using chromosomes according to their arity, the highest quality genetic material may be retained without archiving every single non-dominated solution. When there may be a relatively large number of non-dominated solutions, particularly due to a relatively large number of objectives under optimization, there may be an explosion of non-dominated chromosomes, as stored in the archive 1202. In some cases, this explosion of chromosomes may lead to the optimization problem becoming intractable. By having a differentiation in the genetic value of different non-dominated chromosomes, it is possible to prune the non-dominated set of chromosomes to maintain the most elite population and discard chromosomes that may have a relatively low arity. In example embodiments, only chromosomes with a predetermined n-arity may be persisted and/or archived. For example, in a non-limiting example optimization, only chromosomes with an n-arity of 3-arity or greater may be persisted and/or archived. In other example embodiments the number of persisted and/or archived chromosomes may be limited to a predetermined number and chromosomes with the highest arity non-domination may be archive first and the archives 1202 may be filled according to arity until the predetermined number of chromosomes have been reached for persistence and/or archiving.

According to example embodiments, there may be any number of different combinations and/or aggregates of objectives that may be used in conjunction with n-arity non-dominated sorting. In some example embodiments, the n-arity rank may be equivalent to the number of objectives in which a particular chromosome is non-dominated, as described above. In other example embodiments, the n-arity rank of a particular chromosome may be equivalent to a number of subsets of objectives in which the particular chromosome is non-dominated. In yet other example embodiments, the n-arity rank of a particular chromosome may be based on a number of averaged objectives in which the particular chromosome is non-dominated. As an example of this last embodiment, consider an airline that has hubs (e.g., in a spoke-and-wheel routing configuration) in city A, city B, and city C. For this airline, if three of the objectives are cumulative delays in each of these cites, solutions that produce low delays in two cities at the expense of the third city may be viewed as a relatively good solution, when in reality it may not be a good implementation for the airline. Thus, if a derived metric such as the average of delays in all three hub cities were used, it may mitigate any solution quality issues arising from n-arity non-domination sorting considering each cities delays individually. It will be appreciated that in this example, the derived metric of the average of all delays in all three hub cities is not itself an objective, but a derived metric that can be used for the purposes of ranking and/or sorting a population of chromosomes. Indeed, there may be any number of other linear, weighted, non-linear combinations of objectives in determining n-arity of a chromosome. Thus, in some ways, the n-arity may provide a measure of the number of metrics in which a particular chromosome beats other chromosomes of a population, regardless of whether the metrics are each of the objectives or any type of combination of objectives. In some cases, there may be three different ways that n-arity of a particular chromosome may be determined. In one example embodiments, the n-arity may represent the number of objectives for which the particular chromosome is non-dominated by other chromosomes of a population. This case may be similar to the method 1400 as described above. In another example embodiment, the n-arity of the particular chromosome may represent a number of metrics, where each of the metrics may be some combination of objectives, in which the particular objective is non-dominated compared to a population of chromosomes. For example, averages of some objectives may be used as a metric for the purposes of non-domination sorting and/or ranking. It will be appreciated that when using derived metrics for the purposes of n-arity sorting, the n-arity relative ranks of various chromosomes of a population may be different from their relative ranks determined using objective-based n-arity sorting. In yet another example, a restricted objective space n-arity determination may be made. In this case, a subset of objectives and their corresponding values may be used for the purposes of ranking and evaluating the chromosomes. For example, the most important objectives may be used for sorting chromosomes and determining an n-arity ranking thereof. Again, it will be appreciated that when using restricted objectives (e.g., a subset of objectives) for the purposes of n-arity sorting, the n-arity relative ranks of various chromosomes of a population may be different from their relative ranks determined using the full set of objectives for n-arity sorting.

It will be appreciated that when a combination (e.g., linear or non-linear) of objectives are combined as aggregated metrics and/or a subset (e.g., restricted set of objectives) are used for the purposes of sorting chromosomes within a population, there may be some modifications to the method 1400, according to example embodiments of the disclosure. For example, at block 1404, a set of objectives may be selected for the purposes of sorting. Furthermore, if derivative metrics (e.g., combination of objectives) are used for sorting, those derivative metrics may be calculated for the chromosome being ranked, as well as other chromosomes in the population. At block 1406, the derived metric may be compared to the derived metrics of all of the other chromosomes in the population. The arity count may be incremented when the chromosome wins a particular metric and the method may loop back as long as there are metrics to compare and rank. It will be appreciated that n-arity sorting and/or n-arity based selection may be used independently in MOEA, or in conjunction with objective space refinement/addition mechanisms. In example embodiments, using derivative metrics with n-arity sorting may result in a particular chromosome to become non-dominated that would have otherwise been dominated using objective-based non-domination sorting with 1-arity.

According to example embodiments of the disclosure, there may be a method. The method may include identifying a plurality of chromosomes associated with a multi-objective evolutionary algorithm optimization problem; selecting a first chromosome from the plurality of chromosomes; determining, for the first chromosome, a respective objective value corresponding to each of a plurality of objectives associated with the multi-objective evolutionary algorithm optimization problem; comparing each of the respective objective values to corresponding objective values of each of the other of the plurality of chromosomes; determining the number of objective for which the first chromosome is non-dominated; and archiving the first chromosome with an indication of the number of objective for which the first chromosome is non-dominated.

It should be noted that the method 1400 may be modified in various ways in accordance with certain embodiments. For example, one or more operations of the method 1400 may be eliminated or executed out of order in other embodiments. Additionally, other operations may be added to the method 1400 in accordance with other embodiments.

Figure 15:
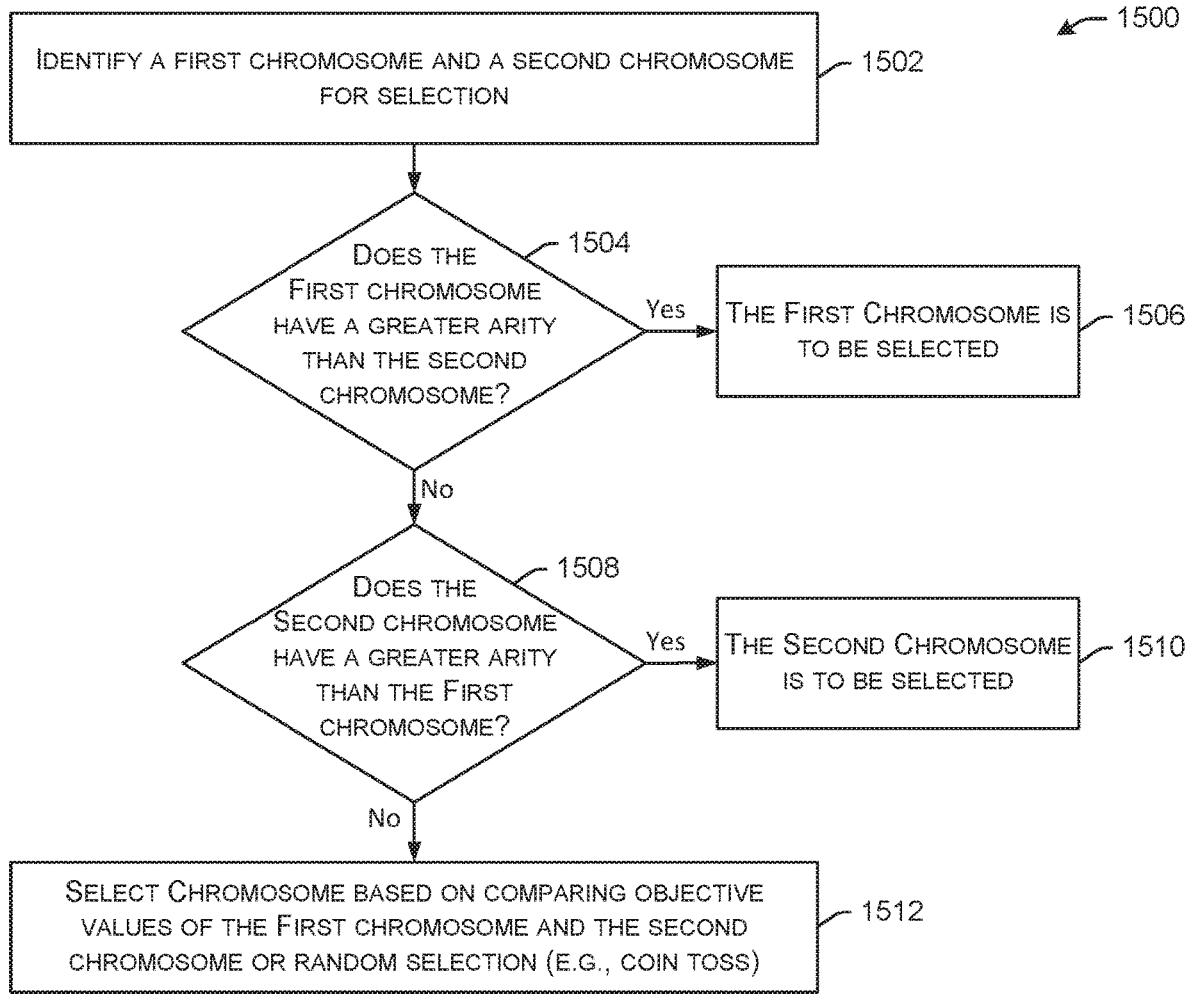
FIG. 15 is a flow diagram that illustrates an example method for chromosome selection considering n-arity non-domination of chromosomes, in accordance with example embodiments of the disclosure.

FIG. 15 is a flow diagram that illustrates an example method 1500 for chromosome selection considering n-arity non-domination of chromosomes, in accordance with example embodiments of the disclosure. This method 1500 may be performed with or without progressive objective addition mechanisms for relatively large number of objective optimization. In example embodiments, method 1500 may be an implementation of the processes of n-arity selection of block 1206 of FIG. 12.

At block 1502, a first chromosome and second chromosome may be identified for selection. One chromosome out of the first chromosome and second chromosome may be selected, such as a tournament selection mechanism. The arity of the non-domination of the first chromosome and the second chromosome may be identified. In some example embodiments, the arity may be determined based at least in part on tiers of the archive 1202 in which the first chromosome and the second chromosome are stored. In other example embodiments, the arity may be determined based at least in part on metadata that may be included in and/or with each of the first chromosome and the second chromosome.

At block 1504, it may be determined if the first chromosome has a greater arity than the second chromosome. If it is determined that the first chromosome does have a greater arity than the second chromosome, then the method may proceed to block 1506, where the first chromosome is selected. In other words, the first chromosome may win a tournament selection over the second chromosome.

If at block 1504 it is determined that the first chromosome does not have a greater arity than the second chromosome, then the method may proceed to block 1508, where it may be determined if the second chromosome has a greater arity than the first chromosome. If it is determined that the second chromosome does have a greater arity than the first chromosome, then the method 1500 may proceed to block 1510, where the second chromosome is selected. In other words, the second chromosome may win a tournament selection over the first chromosome.

If at block 1508, it is determined that the second chromosome does not have a greater arity than the first chromosome (e.g., the first and second chromosomes have the same arity), then the method 1500 may proceed to block 1512. At block 1512, a chromosome may be selected based on comparing objective values of the first chromosome and the second chromosome or by random selection (e.g., coin toss).

It will be appreciated that when performing n-arity selection (e.g., tournament selection), considering n-arity of the chromosomes from which to select, such as for the processes of n-arity selection of block 1206 of FIG. 12, the chromosome with the greatest arity non-domination may win. In other words, the chromosome that is non-dominated according to the greatest number of objectives wins relative to other chromosomes. Such a chromosome may be more elite and its genetic content may be more valuable for the purposes of optimization. Thus by using n-arity selection 1206, the most elite genetic material may be preferentially used for solution propagation (e.g., cross-over 1208).

It will be appreciated that the effect of using n-arity for tournament selection is that a chromosome with a higher n-arity relative to another chromosome is more likely to win the selection and thus have its building block participate more often. Thus, a better genetic quality of a chromosome with a greater n-arity value is likely to be more persistent in the population solutions that are evaluated and propagated.

It should be noted that the method 1500 may be modified in various ways in accordance with certain embodiments. For example, one or more operations of the method 1500 may be eliminated or executed out of order in other embodiments. Additionally, other operations may be added to the method 1500 in accordance with other embodiments.

Figure 16:
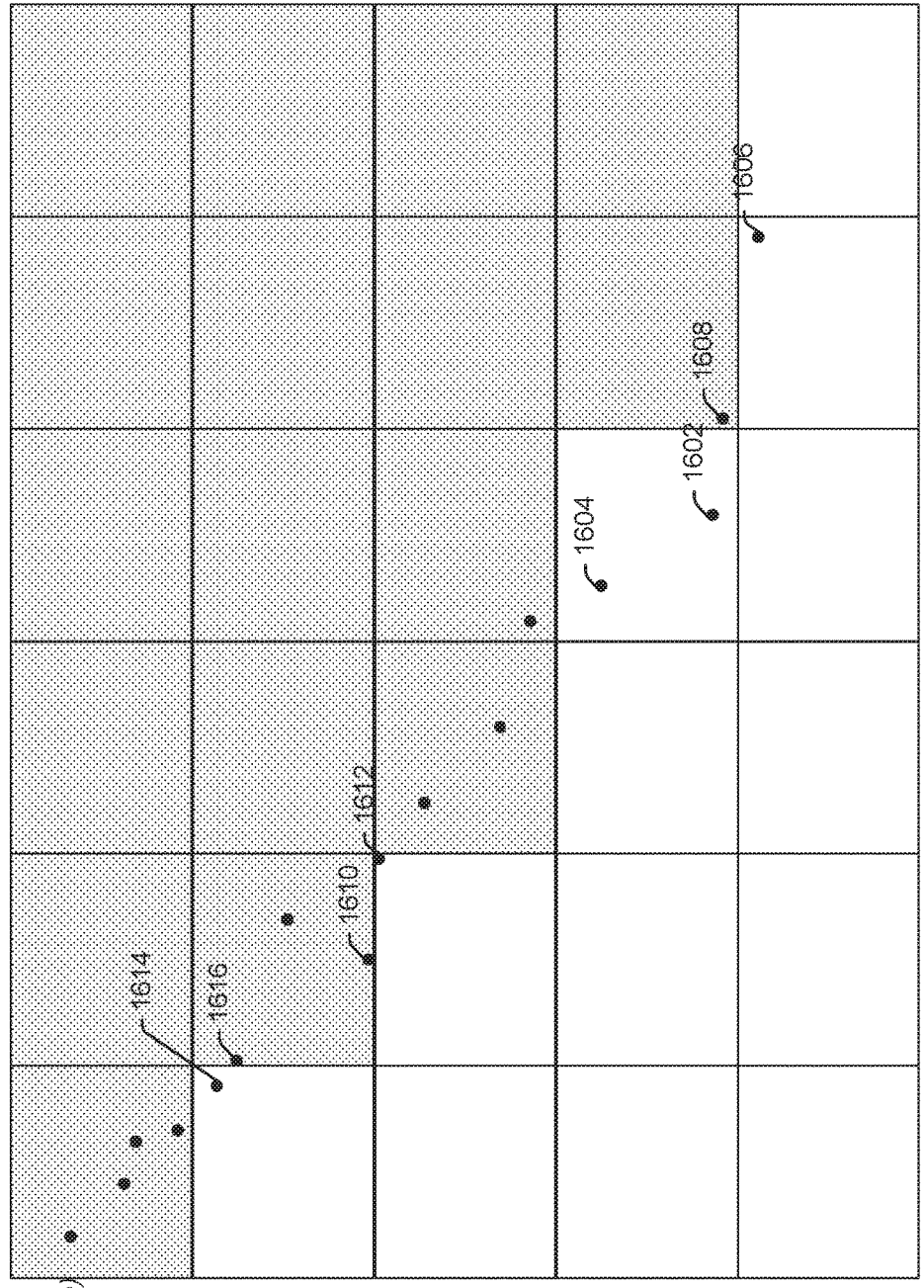
FIG. 16 is a chart that illustrates an example mechanism for identifying resilient chromosomes that may be selected in conjunction with relatively larger epsilon spaces for relatively high-order objective optimization problems, in accordance with example embodiments of the disclosure.

FIG. 16 is a chart that illustrates an example mechanism 1600 for identifying resilient chromosomes that may be selected in conjunction with relatively larger epsilon spaces for relatively high-order objective optimization problems, in accordance with example embodiments of the disclosure. This mechanism 1600 may be performed with or without progressive objective addition mechanisms for relatively large number of objective optimization. The processes of mechanism 1600, as discussed herein, may, in example embodiments, be implemented as part of this mechanism 1600 may be used in the epsilon seed discovery of block 1218 of FIG. 12. For purposes of illustration, two objective functions are shown (e.g., f1 and f2). It will be appreciated that the mechanism 1600 shown here can be extended to three-dimensions (e.g., three objectives) or hyper-dimensional space (e.g., more than three dimensions).

In example embodiments, the epsilon area/space, as represented by the squares of FIG. 16 may be made larger than it would be otherwise. In other words, the span of objective value on the one or more sides (e.g., inclusive of sides in a hyper-dimensional sense) of an epsilon area/space may be reduced relative to situations where there may be a relatively lower number of objectives. By increasing the size of the epsilon area/space, a reduced number of epsilon non-dominated solutions may be found. However, the reduction in the epsilon space/area may also result in the loss of legitimately good genetic material (e.g., solutions) that should be retained in the population. Thus residual seeds may be identified that may be propagated from one generation to the next and/or from one steering event to the next. These residual seeds may be selected from among the population of chromosomes, and sometimes even from epsilon volumes/areas that have been dominated and/or from epsilon volumes/areas from which a non-dominated chromosome has been identified. Thus, a smaller number of chromosomes may be archived due to larger epsilon volume/area, while at the same time there may be some safeguards that quality genetic material is not discarded.

As shown in FIG. 16, the epsilon areas that are shaded have been dominated. According to traditional mechanisms of identifying epsilon non-dominated solutions, no solutions would be selected from the dominated (e.g., shaded) epsilon areas. Furthermore, only a single (or predetermined number) of chromosomes may be selected from each non-dominated epsilon area. The chromosome to be chosen as non-dominated form any single non-dominated epsilon area may be identified by any variety of mechanisms. In some cases, a Euclidean distance to the utopia corner may be determined for each of the chromosomes in a particular non-dominated epsilon area. As a non-limiting example, chromosome 1602 and chromosome 1604 are both in a non-dominated epsilon area. Thus, it may be determined how far each of the chromosomes 1602, 1604 are from the utopia corner (e.g., bottom left corner of epsilon area, since f1 and f2 are to be minimized). Upon determining the Euclidean distance of each of the chromosomes 1602, 1604, the chromosome 1602, 1604 with the shortest distance to the utopia corner may be selected as being non-dominated.

In example embodiments, according to the mechanism described above, chromosomes 1602, 1606, 1612, 1614 may be selected as non-dominated solutions. Each of chromosomes 1602, 1606, 1612, 1614 are in a non-dominated epsilon space and within its respective non-dominated epsilon space is closest to the corresponding utopia corner. According to example embodiments of the disclosure, additional residual seed chromosomes may be selected for persistence and/or archiving. For example, chromosome 1608, although not in a non-domination epsilon space may be selected, as it may be closer to the utopia corner of the epsilon area of chromosome 1606 than chromosome 1606. Additionally, chromosome 1604, although further from the utopia corner than 1602, has a better f1 objective and therefore may also be archived along with 1602, resulting in more than one chromosome within the same non-dominated epsilon cell. Chromosomes 1610, 1616 may be selected for persistent seeding and/or archiving for similar or alternate reasons. Chromosome 1610 performs better according to objective f1 than chromosome 1612 without performing much worse according to objective f2. Thus, because chromosome 1610 is identified as still having value, even though in a dominated epsilon cell, when compared with chromosome 1612 that is located in neighboring non-dominated epsilon cell, chromosome 1610 may be archived along with chromosome 1612. Thus, because chromosome 1610 dominates, according to at least one objective, an otherwise non-dominated chromosome 1612 located in a neighboring non-dominated epsilon cell, chromosome 1610 may be archived along with chromosome 1612. Chromosome 1616 may be yet another candidate for archiving and/or resilient seeding. The resilient seeding, as discussed here, may be injected into the population of chromosomes to be propagated from generation to generation or across steering events when there is a change in objectives to be evaluated.

It will be appreciated that within an epsilon box (e.g., a box in a hyperdimensional sense), there may be a utopia corner, or otherwise a corner that may be better performing from a multi-objective standpoint, than other locations of the epsilon box. In some example embodiments, a single solution or a subset of all the solutions within a particular epsilon box may be retained for each epsilon box. Thus, in example embodiments, a pareto-front may include a single (or a predetermined number) solution within one or more epsilon boxes, where the epsilon boxes are non-dominated by each of the other epsilon boxes. In some example embodiments, the single solution may be selected by determining a distance to the utopia corner of the epsilon box. For example, if there are multiple potential chromosomes in a particular epsilon box, the chromosome that is least distal from the utopia corner may be retained. This distance determination (e.g., Euclidean distance, cosine distance, etc.) mechanism for selecting the retained chromosome may be applied to either feasible solutions or soft infeasible solutions. Alternatively, in some example embodiments, non-domination sorting using the objective values of either the feasible solutions or the soft-constraint solutions may be performed to identify chromosomes within an epsilon box to retain. It will be appreciated when using non-domination sorting within the epsilon box that multiple solutions may be retained and that solutions with the best objective value for any particular objective will not be pruned. In other words, non-dominated chromosomes within an epsilon box may be retained in these example embodiments.

In still further example embodiments, other mechanisms may be employed for the purposes of determining which chromosome(s) to retain within each of the epsilon boxes at, or in proximity of, the best-known pareto-front. Other techniques may include determining a Euclidean distance to the sweet spot of the epsilon box for each of the chromosome(s) with a particular epsilon box. From this, a thresholding mechanism may be used to select the chromosomes with the particular epsilon box to retain. Alternatively, a predetermined number of the most proximal chromosome(s) to the sweet spot of the epsilon box may be retained. Other example embodiments may include performing a non-domination sorting with only a subset of the objectives to identify the chromosome(s) to retain within a particular epsilon box. Further still, in other example embodiments, a gradient-descent mechanism using all or a subset of objectives may be used to select the chromosome(s) to retain within a particular epsilon box. In yet further example embodiments, a single (or predetermined number of) chromosome that displays the best performance according to each of the objectives of the multi-objectives may be retained within an epsilon box. In additional example embodiments, the determination of which chromosome(s) to preserve within an epsilon box may be based at least in part on a determination of which chromosomes provide the greatest genetic diversity. For example, the chromosome that is closest to the sweet spot of the epsilon box (e.g., such as determined by Euclidean distance) may be preserved. Then a cross-correlation (e.g., a weighted cross-correlation) of all of the genes of each of the chromosomes to the first retained chromosome within the epsilon box may be performed to determine which of the other chromosomes provide the greatest genetic diversity. It will be appreciated that there may be any number of mechanisms, including any combinations of the aforementioned mechanisms, to identify a plurality of chromosome(s) that may be retained within a particular epsilon box. It will further be appreciated that a relatively greater quantity of relatively high quality genetic information may be preserved in a population if there is an allowance for propagating more than one chromosome from one generation to the next.

Figure 17:
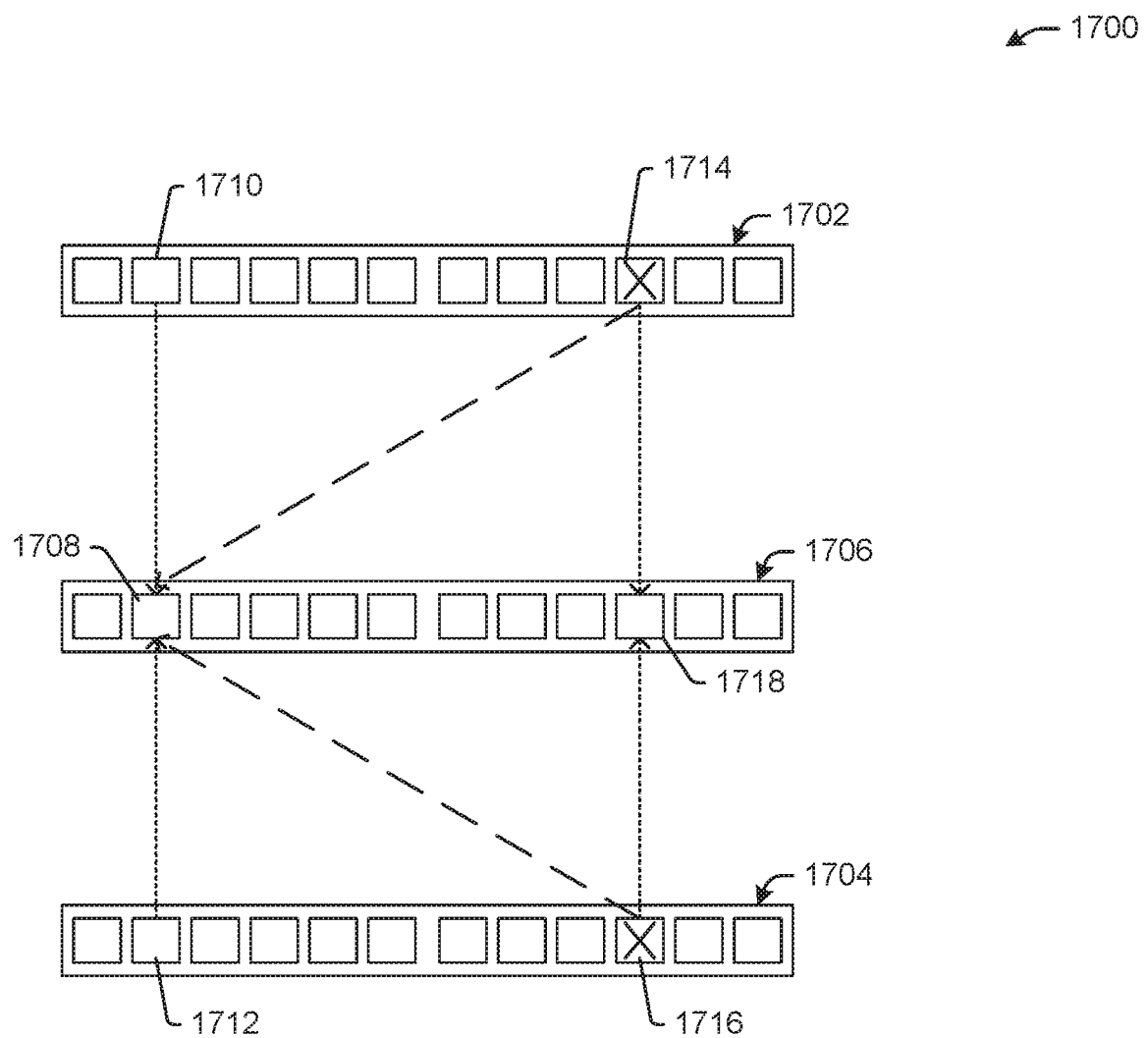
FIG. 17 is a schematic diagram that illustrates an example mechanism for gene hinting during cross-over using one or more hinting genes, in accordance with example embodiments of the disclosure.

FIG. 17 is a schematic diagram that illustrates an example mechanism 1700 for gene hinting during cross-over using one or more hinting genes 1714, 1716, in accordance with example embodiments of the disclosure. The mechanism of gene hinting may be an example of the processes of block 1211 of FIG. 12.

According to example embodiments, two or more parent chromosomes 1702, 1704 may be applied to a cross-over operation to generate a child chromosome 1706. The genes of the child chromosome 1706 may be based at least in part on the corresponding genes of the parent chromosomes 1702, 1704. In example embodiments, the genes of the child chromosome 1706 may be any suitable combination and/or selection of the corresponding genes of the parent chromosomes 1702, 1704. For example, gene 1708 of child chromosome 1706 may be based at least in part on the corresponding genes 1710, 1712 of the parent chromosomes 1702, 1704. According to example embodiments of the disclosure particular genes of a child chromosome, in addition to corresponding genes of the parent chromosomes, may further be based at least in part on one or more other genes in the parent chromosome. For example, gene 1708, in addition to being based at least in part on genes 1710, 1712 of parent chromosomes 1702, 1704 may further be based at least in part on hinting genes 1714, 1716 of parent chromosomes 1702, 1704. Thus, in example embodiments, the hinting genes 1714, 1716 may contribute to the cross-over function such that the gene 1708 of a child chromosome 1706 may be a result of not only the corresponding genes 1710, 1712 of the parent chromosomes 1702, 1704, but also of the hinting genes 1714, 1716. In other words, for certain genes (e.g., the identified genes to be hinted at by hinting genes), the cross-over process may be a process that uses a genes other than corresponding genes of parent chromosomes. Thus, a hinting gene may influence offspring non-corresponding gene in an offspring chromosome. In this way, the hinting gene may influence a decision variable that may not, on the surface, appear to be related to that hinting gene.

In some example embodiments, one or more hinting genes 1714, 1716 may participate in a cross-over operation to determine a corresponding gene 1718 of the child chromosome 1706 in addition to hinting (e.g., influencing) another gene 1708 of the child population. It will be appreciated that in other non-limiting examples gene 1718 may also be influenced by other hinting genes of one or more parent chromosomes 1702, 1704. It will still further be appreciated that in other example embodiments, there may be more than one hinting gene from a parent chromosome that influences a particular gene in a child chromosome. Indeed, it will be appreciated that there may be one or more parents from which one or more hinting genes are used to determine a corresponding gene 1718.

In some example embodiments, the gene hinting may have a predetermined weight in influencing the corresponding gene in a child chromosome. As a non-limiting example, the resilient hinting genes 1714, 1716, together, may have a 20% influence on the gene 1708 of the child chromosome, while the corresponding genes of the parent chromosomes may each contribute 40% to the corresponding gene of the child chromosome. In other example embodiments, the hinting genes may influence a gene in a child chromosome according to a predetermined function (e.g., a linear function, piecewise linear function, a non-linear function, etc.). In an alternative example, the hinting genes 1714, 1716 may have a 100% influence and thus there is no influence of genes 1710 and 1712 in the production of gene 1708.

It will be appreciated that gene hinting may be used in applications where a particular decision variable may provide some indication as to what a good guess, or at least a guess at a trend, of another gene to realize optimized performance from the child chromosome. For example, hinting genes may be particularly useful in applications include separate decision variables that represent a progression in time of a particular physical metric. In these cases, a past optimization of that metric may provide a hint or guess as to a relatively good starting point of a gene that represents a time progression of that physical metric.

The disclosure is described above with reference to block and flow diagrams of systems, methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method, comprising:
   identifying, by one or more processors of a multi-objective evolutionary algorithm system, a plurality of objectives associated with a multi-objective optimization problem;
   performing, by the one or more processors, a first heuristic optimization according to a first set of objectives to generate a first optimized chromosome, wherein the first set of objectives comprises a subset of the plurality of objectives, having one or more of the plurality of objectives, and wherein the first optimized chromosome is a pareto-optimized solution of the first heuristic optimization, wherein the subset of the plurality of objectives include fewer objectives than the plurality of objectives;
   performing, by the one or more processors, a second heuristic optimization according to all of the plurality of objectives to generate a second optimized chromosome, wherein the first optimized chromosome is used as a starting point for the second heuristic optimization; and
   providing, by the one or more processors and based at least in part on the second heuristic optimization, a solution to the multi-objective optimization problem as the second optimized chromosome.

2. The method of claim 1, further comprising:
   performing, by the one or more processors, a third heuristic optimization according to a second set of objectives to generate a second third optimized chromosome, wherein the second set of objectives comprise one or more of the plurality of objectives, and wherein the third optimized chromosome is a pareto-optimized solution of the third heuristic optimization; and
   wherein performing the first heuristic optimization comprises using the third optimized chromosome as a starting point for the first heuristic optimization.

3. The method of claim 2, wherein the first set of objectives includes a first objective and a second objective, and wherein the second set of objectives includes at least one of: (i) the first objective; or (ii) different ones of the plurality of objectives than the first set of objectives.

4. The method of claim 1, wherein performing the second heuristic optimization further comprises appending one or more genes to the first optimized chromosome, wherein the one or more genes are associated with the plurality of objectives.

5. The method of claim 1, wherein performing the first heuristic optimization comprises:

determining a number of objectives for which the first optimized chromosome is non-dominated by a plurality of chromosomes associated with the first optimization; and archiving the first optimized chromosome identifying the number of objectives for which the first optimized chromosome is non-dominated.

6. The method of claim 1, wherein performing the first heuristic optimization comprises:

identifying a subset of the first set of objectives;

determining a number of objectives from the subset of the first set of objectives for which the first optimized chromosome is non-dominated by a plurality of chromosomes associated with the first optimization; and archiving the first optimized chromosome identifying the number of objectives for which the first optimized chromosome is non-dominated.

7. The method of claim 1, wherein performing the first heuristic optimization comprises:

identifying a plurality of metrics, each of the metrics derived from values associated with the first set of objectives;

determining values corresponding to each of the plurality of metrics for the first optimized chromosome and a plurality of chromosomes associated with the first optimization;

determining a number of metrics from the plurality of metrics for which the first optimized chromosome is non-dominated by the plurality of chromosomes associated with the first optimization; and archiving the first optimized chromosome identifying the number of metrics for which the first optimized chromosome is non-dominated.

8. The method of claim 1, wherein performing the first heuristic optimization comprises:

identifying a second non-dominated chromosome;

identifying a third non-dominated chromosome; and performing a cross-over operation with the second non-dominated chromosome and the third non-dominated chromosome to generate the first optimized chromosome, wherein the second non-dominated chromosome is selected from among a fourth non-dominated chromosome and the second non-dominated chromosome, wherein the second non-dominated chromosome is non-dominated based on a greater number of objectives or metrics than the fourth non-dominated chromosome.

9. The method of claim 1, wherein performing the first heuristic optimization to generate the first optimized chromosome further comprises:

selecting a first parent chromosome and selecting a second parent chromosome;

identifying a first gene of the first optimized chromosome;

identifying a first parent gene of the first parent chromosome, the first parent gene corresponding to the first gene;

identifying a second parent gene of the second parent chromosome, the second parent gene corresponding to the first gene;

identifying a hinting gene of the first parent chromosome; and determining a value of the first gene based at least in part on the first parent gene, the second parent gene, and the hinting gene.

10. The method of claim 1, further comprising selecting a resilient chromosome from a dominated epsilon space, and based at least in part on at least one of: (i) a Euclidean distance of the resilient chromosome from a utopia corner of a non-dominated epsilon space; or (ii) a determination that at least one the resilient chromosome dominates a non-dominated chromosome according to at least one objective.

11. A system, comprising:

a memory that stores computer-executable instructions;

at least one processor configured to access the memory, wherein the at least one processor is further configured to execute the computer-executable instructions to:

identify a plurality of objectives associated with a multi-objective optimization problem;

perform a first heuristic optimization according to a first set of objectives to generate a first optimized chromosome, wherein the first set of objectives comprises a subset of the plurality of objectives, having one or more of the plurality of objectives, and wherein the first optimized chromosome is a pareto-optimized solution of the first heuristic optimization;

perform a second heuristic optimization according to all of the plurality of objectives to generate a second optimized chromosome, wherein the first optimized chromosome is used as a starting point for the second heuristic optimization, wherein the plurality of objectives include a greater number of objectives than the subset of the plurality of objectives; and provide, based at least in part on the second heuristic optimization, a solution to the multi-objective optimization problem as the second optimized chromosome.

12. The system of claim 11, wherein the at least one processor is further configured to execute the computer-executable instructions to:

perform a third heuristic optimization according to a second set of objectives to generate a third optimized chromosome, wherein the second set of objectives comprise one or more of the plurality of objectives, and wherein the third optimized chromosome is a pareto-optimized solution of the third heuristic optimization, and wherein performing the first heuristic optimization comprises using the third optimized chromosome as a starting point for the first heuristic optimization.

13. The system of claim 11, wherein the first set of objectives includes a first objective and a second objective, and wherein the second set of objectives includes at least one of: (i) the first objective; or (ii) different ones of the plurality of objectives than the first set of objectives.

14. The system of claim 11, wherein the at least one processor configured to perform the second heuristic optimization comprises the at least one processor configured to append one or more genes to the first optimized chromosome, wherein the one or more genes are associated with the plurality of objectives.

15. The system of claim 11, wherein the at least one processor configured to perform the first heuristic optimization comprises the at least one processor configured to:

determine a number of objectives for which the first optimized chromosome is non-dominated by a plurality of chromosomes associated with the first optimization; and archive the first optimized chromosome identifying the number of objectives for which the first optimized chromosome is non-dominated.

16. The system of claim 11, wherein the at least one processor configured to perform the first heuristic optimization comprises the at least one processor configured to:

identify a subset of the first set of objectives;

determine a number of objectives from the subset of the first set of objectives for which the first optimized chromosome is non-dominated by a plurality of chromosomes associated with the first optimization; and archive the first optimized chromosome identifying the number of objectives for which the first optimized chromosome is non-dominated.

17. The system of claim 11, wherein the at least one processor configured to perform the first heuristic optimization comprises the at least one processor configured to:
identify a plurality of metrics, each of the metrics derived from values associated with the first set of objectives;
determine values corresponding to each of the plurality of metrics for the first optimized chromosome and a plurality of chromosomes associated with the first optimization;
determine a number of metrics from the plurality of metrics for which the first optimized chromosome is non-dominated by the plurality of chromosomes associated with the first optimization; and
archive the first optimized chromosome identifying the number of metrics for which the first optimized chromosome is non-dominated.

18. The system of claim 11, wherein the at least one processor configured to perform the first heuristic optimization comprises the at least one processor configured to:
identify a second non-dominated chromosome;
identify a third non-dominated chromosome; and
perform a cross-over operation with the second non-dominated chromosome and the third non-dominated chromosome to generate the first optimized chromosome,
wherein the second non-dominated chromosome is selected from among a fourth non-dominated chromosome and the second non-dominated chromosome, wherein the second non-dominated chromosome is non-dominated based on a greater number of objectives or metrics than the fourth non-dominated chromosome.

19. The system of claim 11, wherein the at least one processor configured to perform the first heuristic optimization to generate the first optimized chromosome comprises the at least one processor configured to:
select a first parent chromosome and selecting a second parent chromosome;
identify a first gene of the first optimized chromosome;
identify a first parent gene of the first parent chromosome, the first parent gene corresponding to the first gene;
identify a second parent gene of the second parent chromosome, the second parent gene corresponding to the first gene;
identify a hinting gene of the first parent chromosome; and determine a value of the first gene based at least in part on the first parent gene, the second parent gene, and the hinting gene.

20. The system of claim 11, wherein the at least one processor is further configured to execute the computer-executable instructions to:
identify that the first optimized chromosome and a third optimized chromosome are in a same epsilon box;
perform an analysis to determine that both the first optimized chromosome and the third optimized chromosome are to be stored in an archive checkpoint, wherein the analysis comprises at least one of: (i) a non-domination sorting between the first optimized chromosome and the third optimized chromosome, (ii) a determination of a Euclidean distance for each of the first optimized chromosome and the third optimized chromosome, (iii) a non-domination sorting between the first optimized chromosome and the third optimized chromosome using reduced sets of objective metrics, (iv) a determination of a best performing chromosome for each objective metric, or (v) a determination of a first genetic diversity of the first optimized chromosome and a second genetic diversity of the second chromosome; and
store, based at least in part on the analysis, both the first chromosome and the second chromosome in an archive checkpoint.

* * * * *